(12) United States Patent
Asbe et al.

(10) Patent No.: US 12,432,204 B2
(45) Date of Patent: Sep. 30, 2025

(54) HARDWARE IDENTITY IMPERSONATION FOR TARGET ACCESS CONTROL

(71) Applicant: QUALCOMM Incorporated, San Diego, CA (US)

(72) Inventors: Samar Asbe, San Diego, CA (US); Vijayakumar Gopalakrishnan, San Diego, CA (US); Ai Li, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/934,774

(22) Filed: Sep. 23, 2022

(65) Prior Publication Data

US 2024/0106824 A1 Mar. 28, 2024

(51) Int. Cl.
*H04L 9/40* (2022.01)

(52) U.S. Cl.
CPC ........ *H04L 63/0876* (2013.01); *H04L 63/101* (2013.01); *H04L 63/1483* (2013.01)

(58) Field of Classification Search
CPC . H04L 9/40; H04L 63/08; H04L 63/10; H04L 63/101; H04L 63/0876; H04L 63/1485; G06F 21/60; G06F 21/604; G06F 21/6218; G06F 17/30221; H04W 12/12
USPC .......................................................... 726/4
See application file for complete search history.

(56) References Cited

U.S. PATENT DOCUMENTS

| | | | | |
|---|---|---|---|---|
| 2011/0161644 A1* | 6/2011 | Nojiri | ................... | G06F 9/5077 713/1 |
| 2011/0252459 A1* | 10/2011 | Walsh | ................. | H04L 63/0823 726/4 |
| 2014/0068791 A1* | 3/2014 | Resch | ................. | G06F 21/6272 726/30 |
| 2014/0230027 A1* | 8/2014 | Cha | ..................... | H04L 63/0815 726/5 |

(Continued)

FOREIGN PATENT DOCUMENTS

GB 2539435 A 12/2016

OTHER PUBLICATIONS

International Search Report and Written Opinion—PCT/US2023/073661—ISA/EPO—Nov. 2, 2023.

*Primary Examiner* — James N Fiorillo
(74) *Attorney, Agent, or Firm* — Polsinelli

(57) ABSTRACT

Systems and techniques are provided for identity impersonation in access control systems. For example, a process for identity impersonation in access control systems can include: receiving, at a hardware identity impersonator from a first access domain, a request to make a target region accessible to a second access domain; updating a second access domain identity data structure to include an entry corresponding to the first access domain, the entry comprising an address of the target region and a first access domain identifier; receiving, at the hardware identity impersonator from the second access domain, an access request to access the target region, wherein the access request comprises an address and a second access domain identifier of the second access domain; and transmitting, at the hardware identity (Continued)

impersonator based on the access request, the address and the first access domain identifier to a memory management unit (MMU) of an access control system.

27 Claims, 8 Drawing Sheets

(56) References Cited

U.S. PATENT DOCUMENTS

| | | | | |
|---|---|---|---|---|
| 2016/0173406 | A1* | 6/2016 | Geller | G06F 9/468 |
| | | | | 709/225 |
| 2016/0196432 | A1* | 7/2016 | Main | H04W 12/08 |
| | | | | 726/1 |
| 2016/0350019 | A1* | 12/2016 | Koufaty | G06F 12/14 |
| 2018/0307853 | A1* | 10/2018 | Mehta | G06F 16/185 |
| 2019/0089712 | A1* | 3/2019 | Baumgarte | H04L 63/102 |
| 2019/0141041 | A1* | 5/2019 | Bhabbur | H04L 9/3228 |
| 2019/0332683 | A1* | 10/2019 | Thummala | H04L 63/102 |
| 2020/0213115 | A1* | 7/2020 | Mathane | G06F 21/575 |
| 2020/0278801 | A1* | 9/2020 | Parker | G06F 21/62 |
| 2021/0303154 | A1* | 9/2021 | Zhang | G06F 3/0685 |
| 2022/0027520 | A1* | 1/2022 | Li | G06F 12/1425 |
| 2022/0400123 | A1* | 12/2022 | Ayoub | G06F 3/067 |
| 2023/0059362 | A1* | 2/2023 | Venzal | G06Q 10/02 |
| 2023/0367833 | A1* | 11/2023 | Kol | H04L 63/0876 |
| 2024/0048592 | A1* | 2/2024 | Viswanathan | H04L 63/20 |
| 2024/0214378 | A1* | 6/2024 | Hutcheson | H04L 63/0435 |

* cited by examiner

HARDWARE IDENTITY IMPERSONATION FOR TARGET ACCESS CONTROL

FIELD

The present disclosure generally relates to security for access control. For example, aspects of the present disclosure relate to using hardware identity impersonator hardware to reduce the complexity of setting up access to target regions (e.g., memory) in order to improve access set up times.

BACKGROUND

Devices often implement various techniques for access control. Access control may refer to the techniques implemented for ensuring that various entities executing on a device may only access targets (e.g., memory regions) for which an entity has appropriate access permissions. Such access control techniques often require complex configuration procedures that include various software entities of a device configuring various hardware components of the device, such that reads and/or writes issued to targets may be checked by the various hardware components before the access is allowed (or denied).

Scenarios exist in which one entity on a device having access to a particular target seeks to share access to at least a portion of the target with another entity for a limited amount of time (e.g., to have some service performed). However, such access sharing in a device implementing access control techniques often requires complex interactions between the sharing entity, various software entities, and/or the entity with which access is being shared to re-configure the various hardware components to allow the access before the service is performed, and to remove the access upon completion of the service. Such complex interactions being performed in order to share target access may reduce the performance of the device, which may, for example, cause the device to fail to meet real-time performance goals.

SUMMARY

Systems and techniques are described herein for using one or more hardware identity impersonator hardware components to reduce the complexity of setting up access to target regions (e.g., memory) in order to improve access set up times. According to some aspects of the present disclosure, the systems and techniques can provide access domains and/or engines therein the ability to share target region access with other access domains and/or engines using a hardware identity impersonator to allow the other access domains and/or engines to impersonate the access domain and/or engine sharing the target region access in order to access the target region.

According to at least one example, a method for identity impersonation in access control systems is provided. The method includes: receiving, at a hardware identity impersonator from a first access domain, a request to make a target region accessible to a second access domain; updating, at the hardware identity impersonator, a second access domain identity data structure to include an entry corresponding to the first access domain, wherein the entry comprises an address of the target region and a first access domain identifier; receiving, at the hardware identity impersonator from the second access domain, an access request to access the target region, wherein the access request comprises an address and a second access domain identifier of the second access domain; and transmitting, by the hardware identity impersonator based on the access request, the address and the first access domain identifier to a memory management unit (MMU) of an access control system.

In another illustrative example, an apparatus for identity impersonation in access control systems is provided. The apparatus may include at least one memory and at least one processor coupled to the at least one memory. The processor may be configured to: receive, via a hardware identity impersonator and from a first access domain, a request to make a target region accessible to a second access domain; update, at the hardware identity impersonator, a second access domain identity data structure to include an entry corresponding to the first access domain, wherein the entry comprises an address of the target region and a first access domain identifier; receive, at the hardware identity impersonator from the second access domain, an access request to access the target region, wherein the access request comprises an address and a second access domain identifier of the second access domain; and transmit, from the hardware identity impersonator based on the access request, the address and the first access domain identifier In another illustrative example, a non-transitory computer readable medium os provided that has stored thereon instructions that, when executed by one or more processors, cause the one or more processors to: receive, via a hardware identity impersonator from a first access domain, a request to make a target region accessible to a second access domain; update, at the hardware identity impersonator, a second access domain identity data structure to include an entry corresponding to the first access domain, wherein the entry comprises an address of the target region and a first access domain identifier; receive, at the hardware identity impersonator from the second access domain, an access request to access the target region, wherein the access request comprises an address and a second access domain identifier of the second access domain; and transmit, via the hardware identity impersonator and based on the access request, the address and the first access domain identifier to a memory management unit (MMU) of an access control system.

In another illustrative example, an apparatus for identity impersonation in access control systems is provided that includes: means for receiving, at a hardware identity impersonator from a first access domain, a request to make a target region accessible to a second access domain; means for updating, at the hardware identity impersonator, a second access domain identity data structure to include an entry corresponding to the first access domain, wherein the entry comprises an address of the target region and a first access domain identifier; means for receiving, at the hardware identity impersonator from the second access domain, an access request to access the target region, wherein the access request comprises an address and a second access domain identifier of the second access domain; and means for transmitting, at the hardware identity impersonator based on the access request, the address and the first access domain identifier to a memory management unit (MMU) of an access control system.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a camera or multiple cameras for capturing one or more images. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
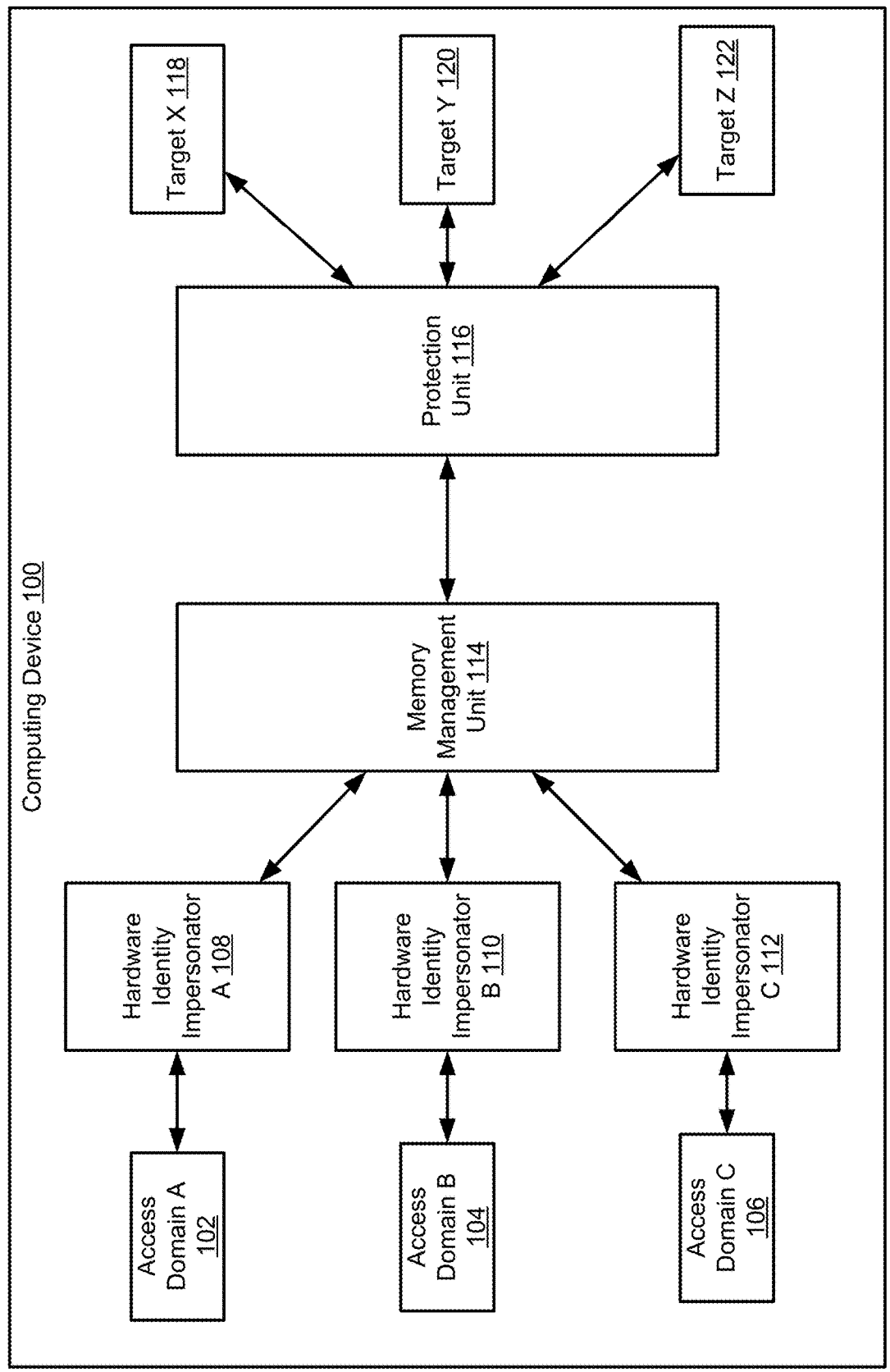
FIG. 1 is a block diagram illustrating a computing device, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection, means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things other than information, such as, for example, electrical current, radio frequency signals, etc.

In certain scenarios, devices (e.g., computing devices, mobile devices, system-on-a-chip (SoC) devices, etc.) implement various techniques for access control for various engines in various access domains to access targets, or regions therein. An access domain may be a group of one or more engines that have the same or similar access permissions for accessing one or more targets. An engine may be any entity (e.g., operating system, application, processing element, direct memory access (DMA) engine, etc.) that is configured to generate read and/or write transactions. A target may be any device, component, etc. (e.g., memory devices (e.g., random access memory (RAM)), input/output (I/O) devices, memory-mapped I/O devices or regions, port-mapped I/O devices or regions, registers, etc.) that is configured to have data written to and/or read from the device, component, etc. A target may have locations (e.g., identified by addresses) to which data may be written to, read from, and/or otherwise accessed and/or operated on. A set of such locations may be referred to as a region of a target. Access control may refer to techniques by which the ability of engines in access domains to access one or more targets and/or target regions is controlled, such that only certain engines and/or access domains may access certain targets.

As an example, to implement access control for several access domains, each including a number of engines configured to perform read, write, and/or other operations, a hypervisor may be used to configure a memory management unit to associate identifiers of the various access domains and/or engines therein with one or more targets (e.g., one or more address ranges of target resources, such as memory devices, registers, etc.). Additionally, a trust zone entity may be used to configure one or more protection units that control access to target resources by, for example, configuring the one or more protection units to include associations between the one or more target resources for which access is controlled by the protection units and the various access domains and/or engines therein that have appropriate permissions to access the various target resources. In such a scenario, once the access control techniques are implemented by having the various software entities configure the memory management unit(s) and protection unit(s), a read, write, and/or other operation may be performed by an engine by first sending the operation to the memory management unit for a first check to be performed and, if the first check is successful, sending the operation to the appropriate protection unit, where a second check is performed. When both checks are successful (indicating that an engine has access permissions for a target region), then the read, write, and/or other operation may be performed, and the results of the operation may be returned through the various components to the engine that initiated the operation.

In some scenarios, an engine and/or access domain may seek to share access to a target and/or target region with another access domain and/or engine in the other access domain in order to, for example, request performance of a particular service using particular data (e.g., when a read is required) or address space (e.g., when a write is required). However, techniques implementing access control in such scenarios often require complex interactions between the engines and/or access domains with various software entities (e.g., a hypervisor and a trust zone) to re-configure the various hardware components (e.g., memory management units, protection units, etc.) in order to share the target and/or target region.

As an example, access control may be implemented, at least in part, by a memory management unit controlled by a hypervisor, and a protection unit controlled by a trust zone entity. In such an example, a first engine in a first access domain may seek to have a second engine in a second access domain perform an integrity check of a particular data item by executing a hash function using the data item to obtain a hash, compare the hash with a previously generated hash of the data item, and return whether the comparison yielded a match. In such a scenario, the second engine, to perform the requested service, requires access to the data item. However, the data item is stored in a memory device (e.g., a target) for which the first engine has exclusive access.

Therefore, to have the service performed in this example scenario, a complex set of interactions is required to reconfigure the memory management unit and the protection unit to allow access to the memory region. To allow the access, the first engine interacts with the hypervisor to request that the hypervisor re-configure the memory management unit to associate the memory region (e.g., a target region) in which the data item is stored with the second engine. Then, the first engine interacts with the trust zone entity to request that the trust zone entity reconfigure the protection unit to associate the memory region with the second engine. Such a reconfiguration of the protection unit may require adding and/or updating several entries to a data structure of the protection unit. As an example, an entry for the portion of the memory of the memory device before the memory region of the data item is created and associated exclusively with the first engine, and a similar entry is created for the portion of the memory after the memory region, while yet another entry is created associating the memory region with shared access for both the first engine and the second engine. Once all of the re-configuration is complete for the memory management unit and the protection unit, the second engine may initiate an operation to read the data item, and the read operation request is checked by the re-configured memory management unit, and then by the re-configured protection unit, and then the read is performed, and the data item is returned to the second engine, thereby allowing the second engine to perform the requested service. After the second engine performs the service (e.g., the integrity check), all of the various re-configurations must then be undone to remove the shared access to the memory region.

Such complex interactions often reduce the performance of devices implementing access control, as reads and/or writes from engines and/or access domains to targets and/or target regions are required to wait for the various interactions and re-configurations to be completed before the access may begin. Moreover, additional device resources are then required to remove the access once the particular requested service is complete. Accordingly, in order to address the improvement of device performance for devices implementing access control techniques, additional capabilities should be added to such devices in order to reduce the complexity of interactions required for sharing access to target resources. Therefore, systems and techniques are needed to add one or more hardware identity impersonator components to devices to allow various engines and/or access domains to allow other engines and/or access domains to impersonate the identity of an engine and/or access domain with which shared access to a target resource is needed.

Systems, apparatuses, processes (also referred to as methods), and computer-readable media (collectively referred to as "systems and techniques") are described herein for augmenting the capabilities of devices implementing access control for target resources to allow for an engine and/or access domain to share access to a particular target resource with a reduced level of complexity of the interactions necessary to make shared access possible. The systems and techniques provide for a hardware component, referred to herein as a hardware identity impersonator, to exist between access domains, including the one or more engines therein, and other various hardware components. In some examples, the hardware identity impersonator is configured to alter the identifier of the engine and/or access domain seeking to access a particular target region to perform one or more operations (e.g., read and/or write operations). Therefore, in some examples, hardware components (e.g., memory management units, protection units, etc.) do not require re-configuration to allow an engine and/or access domain to access a particular target and/or target region, which may reduce the complexity of sharing target access and, thus, improve device performance.

In some examples, an access domain is any set of one or more engines with the same or similar set of access permissions to target resources. In some examples, an engine is any entity executing on a device that is configured to perform operations (e.g., read and/or write operations) on a target resource. Examples of an engine include, but are not limited to, operating systems, trust zone managing entities, DMA engines, applications, processes, processing elements, etc. In some examples, a target resource (which may be referred to herein as a target) is any device, component, etc. that does and/or is configured to store data at identifiable locations. Examples of a target include, but are not limited to, memory of a memory device (or any portion thereof), any number of registers for storing any amount of data, any portion of any I/O device capable of storing data, a storage device (or any portion thereof), a memory-mapped I/O device, a device mapping registers to memory regions, etc. A given computing device may include any number of access domains, each including any number of engines. A computing device may also include any number of targets. Any one or more of the access domains and/or engines therein may be configured to access any one or more targets of the computing device.

Such access may be controlled, at least in part, by one or more memory management units and/or one or more protection units. In some examples, a memory management unit is a hardware component that receives operations seeking to access locations at which data may be stored, and may perform various related services, such as address translation. A memory management unit may also perform such services as access control, during which the memory management unit determines whether a given engine and/or access domain is associated with, and thus has access permission for, a particular target, or portion thereof. To that end, a memory management unit may include any number of data structures, each including any number of entries, that include an association between an engine and/or access domain and one or more targets (thereby indicating valid access permissions), as well as circuitry for processing operation requests based at least in part on the one or more data structures.

Such access may be further controlled, at least in part, by one or more protection units. In some examples, a protection unit is a hardware component that is configured to provide additional access control protection for various target resources (e.g., memory, registers, etc.). In some examples, a particular protection unit of a computing device controls, at least in part, access to a certain set of target resources (e.g., one or more memory devices, one or more sets of registers, any combination thereof, etc.). To that end, a protection unit may include any number of data structures, each including any number of entries, that include an association between target resources and engines and/or access domains that have appropriate access permissions for the target resources, as well as circuitry for processing operation requests based at least in part on the one or more data structures.

In some examples, access control using hardware components such as, for example, a memory access unit and/or a protection unit may be controlled, at least in part, using a hardware identity impersonator. In some examples, a hardware identity impersonator is any hardware (e.g., circuitry) and/or data structure storage (e.g., registers) configurable to allow one engine and/or access domain to impersonate the identity of another engine and/or access domain to allow sharing of access-controlled target resources between the access domains and/or engines.

In some examples, each access domain that may be granted the ability to impersonate another access domain in order to access a target is configured with a dedicated hardware identity impersonator. Such a hardware identity impersonator may include an access domain identity data structure configured to include any number of entries. In some examples, such an entry includes, but is not limited to: an identifier of an access domain and/or an engine therein that is granting access to a target resource; and a target resource, or region therein (e.g., an address range), to which access is being granted. In some examples, the identifier in such an entry is an identifier of a different engine and/or access domain than the engine and/or access domain associated with the access domain identity data structure in the hardware identity impersonator that includes the entry, and indicates that the different access domain and/or engine has permission to request modification of the entry to grant temporary access to a target. Thus, each entry is associated logically with two access domains; (i) the access domain for which the hardware identifier is associated that will be impersonating other access domains; and (ii) the access domain identified by an identifier in the entry, which identifies a separate access domain that has permission to modify the entry. In some examples, the identifier of a different access domain and/or engine in an entry is also the identifier that allows for impersonating the identity of the access domain and/or engine by being substituted for an identifier of the access domain for which the hardware identity impersonator is configured.

In other examples, rather than being configured for an access domain that will be impersonating the identity of another access domain, a hardware identity impersonator may be configured for access domains that will be granting access to other access domains to access target resources. In such examples, the hardware identity impersonator is associated with the access domain that will be granting the access by way of being dedicated to that access domain. An entry in an access domain identity data structure may include an identifier of an access domain to which access to a target is being granted, and the entry may be associated with that particular access domain. Such an entry may also include a target, or region therein, to which access id being granted.

In still other examples, a single hardware identity impersonator may be configured for more than one access domain. In such examples, each entry in an access domain identity data structure of the hardware identity impersonator may include the target and/or region therein for which access is being granted, an identifier of the access domain granting access, and an identifier of the access domain to which access is being granted. The identifier of the access domain granting the access may identify the entry as being associated with the granting access domain (and thus is the only access that may update the entry), and may also be used as the impersonated identity used when the access domain to which access is being granted seeks to access the target. The identifier of the access domain to which access is being granted may indicate that the entry is associated with that access domain, such that when the access domain seeks to access the target in the entry, the hardware identity impersonator may replace the access domain identifier of the access domain seeking to access the target with the access domain identifier of the access domain that granted access to the target.

Entries may be allowed in access domain identity data structures for any one or more engines and/or access domains having access to one or more access controlled target resources. As an example, a particular engine and/or access domain may be assigned a particular set of one or more entries for which an update may be requested to grant at least temporary access to a target resource to another access domain and/or engine. An access domain identity data structure may include any other items of information without departing from the scope of examples described herein. As an example, an entry in an access domain identity data structure may include a valid indicator that indicates whether the entry is valid at a given point in time.

In some examples, when a first access domain and/or engine therein seeks to allow access to a target to a second access domain and/or engine, the first access domain and/or engine may cause an update of the access domain identity data structure of the second access domain and/or engine to which access is to be granted to include an entry that includes at least an identifier of the first access domain and/or engine seeking to allow access, and an identifier (e.g., an address range) of at least a portion of the target to which temporary access is being granted.

In some examples, after updating the access domain identity data structure of the access domain and/or engine to which access to at least a portion of a target is being granted, the access domain seeking to allow access may provide an indication to the access domain to which access is being granted a request for a service to be performed. In some examples, in response, the access domain and/or engine to which access is being granted may confirm that access has been granted by verifying that a valid indicator exists in the entry in its associated access domain identity data structure for the target associated with the request.

In some examples, once the validity of the granting of access to the target is verified, the access domain and/or engine to which access to a target, or portion thereof, has been granted transmits a request to perform an operation to a hardware identity impersonator (e.g., its associated hardware identity impersonator). In some examples, the request includes any number of bus attributes. Examples of such attributes include, but are not limited to, an address of the target at which the target region to be accessed begins, a size of the target region to be accessed (e.g., four bytes), the type or operation to be performed (e.g., read, write, etc.), an identity of the engine and/or access domain seeking to perform the operation, a transaction number, etc.

In some examples, in response to receiving such a request, the hardware identity impersonator may use hardware logic (e.g., implemented in circuitry) to perform a lookup of the address in the access identity data structure associate with the requesting engine and/or access domain. In some examples, if the address is not found, the operation request is denied. An operation request may also be denied, for example, if the access domain requesting the operation is not associated with the entry that includes the target address. In some examples, if the address is not found in the access domain identity data structure, the operation request may still be attempted using the identity of the access domain and/or engine requesting the operation. In some examples, if the address is found (and the requesting access domain is associated with the entry in which the address is found), the hardware identity impersonator replaces the identifier of the engine and/or access domain that requested the operation with an identifier, from the entry corresponding to the address, that is associated with the engine and/or access domain that requested the update to the entry to allow access to the target region. In some examples, the replacement of the identifier of the engine and/or access domain requesting the operation with the identifier of the engine and/or access domain that has access to the target resource and that requested the shared access may be referred to as impersonating the identity of the engine and/or access domain having access to the target resource by the engine and/or access domain requesting the operation.

In some examples, the operation request is then transmitted, with bus attributes that include the impersonated identity, to the various hardware components that contribute to the access control techniques being implemented on the computing device. As an example, the bus attributes may be transmitted to a memory management unit, which verifies that the impersonated identity has access permissions for the target resource region, and then to a protection unit, which verifies that the target resource region is associated with access permissions that indicate that an entity having the impersonated identity may access the target resource region. In some examples, once the various hardware components (which may be referred to collectively as access permission checking blocks) perform successful checks of the access attempt based on the impersonated identity, the operation may be performed, and the result(s) of the operation may be returned (e.g., based, for example, on a transaction number associated with the operation request and included in the bus attributes), via the hardware identity impersonator, to the engine and/or access domain that initially requested the operation. The engine and/or access domain that requested the operation may then use the results of the operation to perform the services requested by the engine and/or access domain that granted the temporary access.

In some examples, once the requested service(s) has/(have) completed, the engine and/or access domain that granted the temporary access to the target resource may then cause the entry granting the access to be removed or otherwise invalidated (which may be referred to herein as deleted) from the access domain identity data structure associated with the engine and/or access domain to which target resource access was granted, thereby removing the access to the target resource.

In some examples, based on having a hardware identity impersonator for a given access domain and/or engine therein substitute an identifier of an engine and/or access domain requesting to perform an operation on a target resource with an identifier of an access domain and/or engine with access permissions for the target resource, the complex interactions required to re-configure various hardware components (e.g., a memory management unit, a protection unit, etc.) are no longer required. Specifically, such components may not require re-configuration, as requested operations may already include an identifier of an engine and/or access domain already known to the hardware components as having access to the target resource specified in the operation request.

Examples described herein may address the need to improve device performance by reducing or eliminating time-consuming software interactions and/or hardware component re-configurations required to allow temporary sharing of target resource access among engines and/or access domains of a computing device.

Various aspects of the systems and techniques described herein will be discussed below with respect to the figures. FIG. 1 is a block diagram of a computing device 100. As shown, the computing device 100 includes an access domain A 102, an access domain B 104, an access domain C 106 (collectively, access domains 102, 104, 106), a hardware identity impersonator A 108, a hardware identity impersonator B 110, a hardware identity impersonator C 112 (collectively, hardware identity impersonators 108, 110, 112), a memory management unit 114, a protection unit 116, a target X 118, a target Y 120, and a target Z 122 (collectively targets 118, 120, 122). Each of these components is described below.

The computing device 100 is any device, portion of a device, or any set of devices capable of electronically processing instructions and may include, but is not limited to, any of the following: one or more processors (e.g. components that include integrated circuitry, memory (e.g., all or any portion of the targets 118, 120, 122), input and output device(s) (not shown), non-volatile storage hardware (e.g., all or any portion of the targets 118, 120, 122), one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the computing device 100 includes any number of access domains (e.g., 102, 104, 106). In some examples, an access domain is a set of one or more engines that have the same or similar security permissions, at least in regards to accessing one or more targets (discussed below). In some examples, an engine (not shown) is any entity executing using resources of the computing device 100 and configured to request operations (e.g., read operations, write operations, etc.) to be performed using targets (e.g., 118, 120, 122). Examples of an engine may include, but are not limited to, an operating system, an application, a service, a process, a processing element, a direct memory access (DMA) engine, etc.

In some examples, an engine may perform operations using a processor (not shown). In some examples, a processor is any component that includes circuitry for executing instructions/operations (e.g., of a computer program). As an example, such circuitry may be integrated circuitry implemented, at least in part, using transistors implementing such components as arithmetic logic units, control units, logic gates, registers, etc. In some examples, the processor may include additional components, such as, for example, cache memory. In some examples, to perform operations, a processor retrieves and decodes instructions, which are then executed. Execution of instructions may include operating on data, which may include reading data, writing data, transforming data, etc. In some examples, the instructions and data used by a processor are stored in the memory and/or other components (e.g., registers) of the computing device 100. A processor may perform various operations for executing software, such as operating systems, applications, etc. A processor may cause data to be written from memory to storage of the computing device 100 and/or cause data to be read from storage via the memory. Examples of processors include, but are not limited to, central processing units (CPUs), graphics processing units (GPUs), neural processing units, tensor processing units, data processing units (DPUs), digital signal processors (DSPs), etc.

In some examples, an access domain (e.g., 102, 104, 106) is associated with one or more identifiers. As an example, the access domain A 102 may be associated with an identifier "A". As another example, the access domain A 102 may be associated with any number of identifiers, each corresponding to one or more engines of the access domain A 102 (e.g., A1, A2, A3, etc.). An identifier corresponding to an access domain, or any engine therein, may be in any form suitable for identifying the access domain and/or engine(s) therein, at least in the context of implementing access control techniques.

Although FIG. 1 shows the computing device 100 as having three access domains 102, 104, 106, the computing device 100 may have any number of access domains without departing from the scope of examples described herein. Additionally, although not shown in FIG. 1, all or any portion of the access domains 102, 104, 106 may be operatively connected to one another to, for example, exchange information, request services from one another, etc.

In some examples, each access domain 102, 104, 106 is operatively connected to at least one hardware identity impersonator. As shown in the example of FIG. 1, the access domain A 102 is operatively connected to the hardware identity impersonator A 108, the access domain B 104 is operatively connected to the hardware identity impersonator B 110, and the access domain C 106 is operatively connected to the hardware identity impersonator C 112. Although FIG. 1 shows separate hardware identity impersonators 108, 110, and 112 as separate components, in some examples, there may be any number of hardware identity impersonators, each corresponding to any one or more access domains and/or engines therein. As an example, the computing device 100 may include a single hardware identity impersonator operatively connected to and configured to perform identity impersonation for all access domains of the computing device 100 having access to one or more access controlled targets, or regions therein.

In some examples, a hardware identity impersonator (e.g., 108, 110, 112) is any hardware, software, firmware, and/or any combination thereof configured to provide identity impersonation services for one or more access domains (e.g., 102, 104, 106). As an example, the hardware identity impersonator A 108 may include one or more data structures that include entries. In some examples, an entry includes an address of a target or target region, associated with an identifier of a access domain and/or engine other than the access domain and/or engine for which the hardware identity impersonator is configured. In some examples, the identifier of the other access domain and/or engine allows the access domain and/or engine associated with the data structure to impersonate the identity of the other access domain and/or engine. In some examples, such a data structure of entries may be referred to as an access domain identity data structure. Access domain identity data structures are discussed in greater detail in the description of FIG. 2, below. In some examples, a hardware identity impersonator (e.g., 108, 110, 112) also includes logic components (e.g., implemented using circuitry) for accessing an access domain identity data structure, manipulating received operations, transmitting operation requests, etc. Although FIG. 1 shows the computing device 100 as including three hardware identity impersonators 108, 110, 112, the computing device 100 may include any number of hardware identity impersonators without departing from the scope of examples described herein.

In some examples, a hardware identity impersonator (e.g., 108, 110, 112) is configured to receive requests to perform operations (e.g., read operations, write operations, etc.) from the one or more access domains and/or engines therein for which the hardware identity impersonator is configured. In some examples, the requests include any number of bus attributes. Examples of bus attributes include, but are not limited to, an address (e.g., a starting address of a target region on which the operation is to operate), a size (e.g., the size of the target region starting at the address, such as, for example, four bytes), the operation to be performed (e.g., read, write, etc.), a transaction number (TXN) associated with the operation that allows the result(s) of the operation to be properly routed back to the engine and/or access domain requesting the operation, other information used for routing the operation request and/or results of the operation (e.g., a port identifier), etc.

In some examples, a hardware identity impersonator (e.g., 108, 110, 112) is further configured to use the address in an operation request to perform a lookup in an access domain identity data structure. Such a lookup may determine, for example, whether the engine and/or access domain requesting the operation has been granted access to a particular target, or target region by another access domain and/or engine. In some examples, if the address does not exist in the access domain identity data structure, the operation request is denied. In some examples, if the address (e.g., memory address, register identifier, etc.) exists in the access domain identity data structure, the operation may proceed.

In some examples, entries of the access domain identity data structure include entries for targets to which the access domain and/or engine(s) therein associated with the hardware identity impersonator have access permissions, and such entries include an identifier of the access domain and/or engine(s). Other entries in the access domain identity data structure may be associated with other access domains and/or engines having access control permissions to targets for which the access domain and/or engine(s) associated with the access domain identity data structure do not have access permissions. In such scenarios, an access domain and/or engine having access permissions to such other targets may grant access to such targets, or regions therein, by requesting an update of entries in the access domain identity data structure with which the access domain and/or engine having access to the other targets is associated.

As an example, the access domain B 104 may seek to allow the access domain A to access a region of target Y 120, for which the access domain B 104 has access permissions, but the access domain A 102 does not. To that end, the access domain B 104 may request an update to the access domain identity data structure of the hardware identity impersonator A 108 at an entry associated with the access domain B 104. Such an update may, for example, include a request for the entry to include an address of a region of the target Y 120, associated with an identifier of the access domain B 104. In this scenario, the access domain B may request that the access domain A, or any engine therein, perform some service using the region of the target Y 120. In order to perform the service, the access domain A 102 may transmit an operation request to the hardware impersonator A that includes bus attributes that include an identifier of the access domain A 102, the address of the target region of the target Y 120, a size of the target region, a transaction number for the operation, etc. The hardware identity impersonator A may then perform a lookup in the access domain identity data structure to find the address included in the bus attributes. Once the lookup is successful, the hardware identity impersonator A 108 may replace the identifier of the access domain A 102 with the identifier of the access domain B, which is obtained from the entry that included the address used to perform the lookup. In some examples, the modified operation request is then transmitted from the hardware impersonator A 108 to the memory management unit 114.

In some examples, the computing device 100 includes the memory management unit 114. In some examples, the memory management unit 114 is any hardware (e.g., circuitry), software, firmware, and/or any combination thereof that is configured to manage, at least in part, any attempts to access targets, or regions therein (e.g., system memory, I/O device memory, registers, etc.) that include references to addresses of the targets, or regions therein. The memory management unit 114 may be operatively connected to any number of hardware identity impersonators (e.g., 108, 110, 112). A memory management unit may be controlled, configured, re-configured, etc., at least in part, by another entity of the computing device 100, such as, for example, a hypervisor, an operating system, I/O device firmware, other hardware components, etc. (not shown). Although FIG. 1 shows the computing device 100 as including a single memory management unit 114, the computing device 100 may include any number of memory management units without departing from the scope of examples described herein.

In some examples, as discussed above, the memory management unit 114 may be a hardware component that receives operations seeking to access locations at which data may be stored, and may perform various related services, such as address translation. A memory management unit may also perform such services as access control, during which the memory management unit determines whether a given engine and/or access domain (e.g., 102, 104, 106) is associated with, and thus has access permission for, a particular target (e.g., 118, 120, 122), or portion thereof. To that end, the memory management unit 114 may include any number of data structures, each including any number of entries, that include an association between an engine and/or access domain and one or more targets, as well as circuitry for processing operation requests based at least in part on the one or more data structures. In some examples, the memory management unit 114 uses all or any portion of the bus attributes (e.g., the address, the impersonated identifier of an access domain and/or engine, etc.) received as part of an operation request from a hardware identity impersonator (e.g., 108, 110, 112) to process operation requests using one or more data structures of the memory management unit 114. Such a data structure may be referred to as a memory management unit data structure. Memory management data structures are discussed further in the description of FIG. 3, below.

In some examples, the computing device 100 includes the protection unit 116. In some examples, the protection unit 116 is any hardware, software, firmware, or any combination thereof that is configured to provide protection (e.g., access control) for any number of targets (e.g., 118, 120, 122). The protection unit 116 may be configured to operate in any number of modes, with each mode providing protection from unauthorized access to certain types of target resources. As an example, the protection unit 116 may include a memory protection unit mode for protecting various memory devices and regions therein, a register protection unit mode for protecting any number of registers of the computing device 100, and/or an address protection unit mode for protecting any number of fragmented or contiguous sets of addresses corresponding to target regions of various targets (e.g., 118, 120, 122). Other modes may be implemented on the protection unit 116 without departing from the scope of examples described herein. The protection unit may be operatively connected to the memory management unit 114, and to any number of targets (e.g., 118, 120, 122). The protection unit 116 may be controlled, configured, re-configured, etc., at least in part, by another entity of the computing device 100, such as, for example, a trust zone entity, a trusted platform module, a security element, another hardware element, a management engine, etc.

In some examples, the protection unit 116 is a hardware component that is configured to provide additional access control protection for various target resources (e.g., memory, registers, I/O memory, etc.). In some examples, the protection unit 116 of the computing device 100 controls, at least in part, access to a certain set of target resources (e.g., one or more memory devices, one or more sets of registers, any combination thereof, etc., such as targets 118, 120, 122). To that end, the protection unit 116 may include any number of data structures, each including any number of entries, that include an association between target resources and engines and/or access domains that have appropriate access permissions for the target resources, as well as circuitry for processing operation requests based at least in part on the one or more data structures. Such a data structure may be referred to as a protection unit data structure. Protection unit data structures are discussed further in the description of FIG. 4, below.

In some examples, the protection unit 116 is configured to receive operation requests from the memory management unit 114. In some examples, the protection unit 116 only receives operation requests that were not denied by the memory management unit 114 (e.g., the access control check of the memory management unit 114 passed for the operation request). In some examples, received operation requests include various bus attributes, such as an address of a target region for which access is requested and an impersonating identifier added by a hardware identity impersonator (e.g., 108, 110, 112). Such bus attributes may be used by the protection unit 116, along with a protection unit data structure, to determine whether the operation request may proceed. In some examples, if the impersonated identifier is not associated with the address in a protection unit data structure, the operation request in denied. In some examples, if the impersonated identifier is associated with the address in the protection unit data structure, the operation request may proceed. In some examples, if the operation request is allowed to proceed by the protection unit 116, the requested operation may be performed using the target resource for which access is requested.

In some examples, the computing device 100 includes any number of targets (e.g., 118, 120, 122). In some examples, a target is any hardware, software, firmware, or any combination thereof that includes locations (e.g., identified by addresses) to which data may be written, from which data may be read, and/or at which any other operation may be performed (e.g., data is deleted, added, modified, updated, etc.). Examples of the targets 118, 120, 122 include, but are not limited to, memory devices (e.g., random access memory (RAM)), input/output (I/O) devices, memory-mapped I/O devices or regions, port-mapped I/O devices or regions, registers, storage devices, etc. The target devices 118, 120, 122 may be operatively connected to the protection unit 116. Although FIG. 1 shows the computing device having three targets 118, 120, 122, the computing device 100 may have any number of targets without departing from the scope of examples described herein.

In some examples, a target (e.g., 118, 120, 122) may include any number of target regions (not shown). In some examples, a target region is any portion of the locations included in a target. As an example, a target region of a memory device may be a region that begins at a particular memory address and extends for a particular number of bytes, which may or may not be contiguous within the memory device. As another example, a target region may be a certain portion of a particular set of registers. Locations of targets (e.g., 118, 120, 122) may be used to perform various operations requested by engines of access domains (e.g., 102, 104, 106).

In some examples, results of requested operations may be returned to the engine and/or access domain that requested the operation. As an example, at entity at each step of the operation request between the requesting entity (e.g., an engine of an access domain) and the target (e.g., 118, 120, 122) used to perform the operation may provide information identifying a portion of a return path for the results of the operation (e.g., a return port) associated with a transaction number corresponding to the requested operation. In such a scenario, a target (e.g., 118, 120, 122) may transmit the result(s) of the operation (e.g., data being read, indication of a successful write, etc.) to the protection unit 116 via a protection unit return port, the protection unit 116 may return the result(s) to the memory management unit 114 via a memory management unit return port, the memory management unit 114 may return the result(s) to the hardware identity impersonator (e.g., 108, 110, 112) that requested the operation using an impersonated identifier via a hardware impersonator return port, and the appropriate hardware identity impersonator may return the result(s) to the access domain (e.g., 102, 104, 106) and/or engine therein that initiated the operation request. If appropriate, the access domain and/or engine may then communicate the outcome of one or more operations to the access domain and/or engine that provided the shared access to the target via a hardware identity impersonator (e.g., 108, 110, 112).

While FIG. 1 shows a certain number of components in a particular configuration, one of ordinary skill in the art will appreciate that the computing device 100 may include more components or fewer components, and/or components arranged in any number of alternate configurations without departing from the scope of examples described herein. As an example, although FIG. 1 shows a variety of components as being included in the computing device 100, all or any portion of such components (e.g., access domains, targets, etc.) may be separate from and operatively connected to the computing device 100 without departing from the scope of examples described herein. As another example, although FIG. 1 shows each access domain to which access is being granted via identity impersonation being configured with a dedicated hardware identity impersonator, other configurations may be used without departing from the scope of examples described herein. Such other configurations may include, but are not limited to: hardware identity impersonators being configured for and dedicated to access domains granting access permissions rather than access domains receiving access permissions; and/or hardware identity impersonators configured for and dedicated to more than one access domain. Accordingly, examples disclosed herein should not be limited to the configuration of components shown in FIG. 1.

Figure 2:
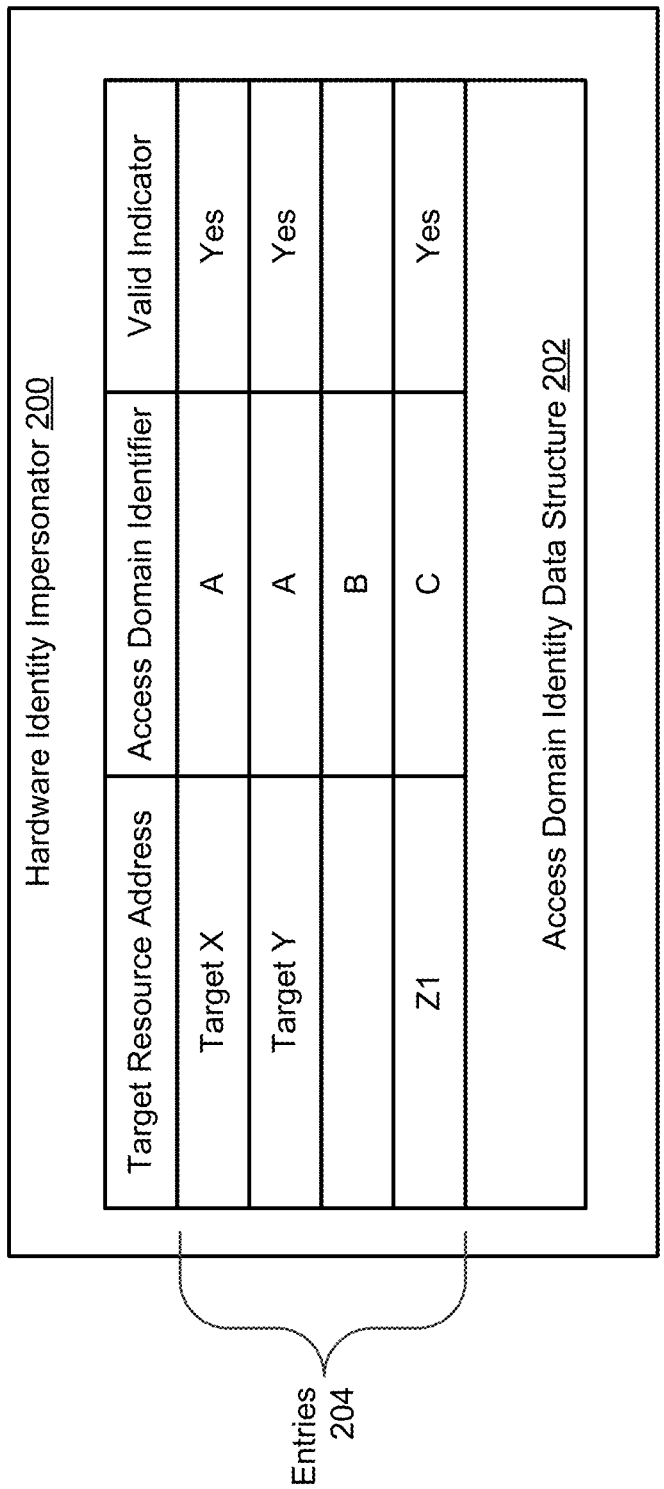
FIG. 2 is a block diagram illustrating a hardware identity impersonator, in accordance with some examples.

FIG. 2 is a block diagram of an example hardware identity impersonator 200 in accordance with one or more examples described herein. In some examples, the hardware identity impersonator 200 is any one of the hardware identity impersonators 108, 110, 112 shown in FIG. 1 and described above. As shown in FIG. 2, the hardware identity impersonator 200 includes an access domain identity data structure 202, and entries 204 which are described below. Other components (e.g., circuitry implementing functionality of the hardware identity impersonator 200) of the hardware identity impersonator 200 are omitted for the sake of clarity.

In some examples, the access domain identity data structure 202 is a data structure of any type (e.g., a table) implemented in one or more hardware components of the hardware identity impersonator 200. In some examples, the access domain identity data structure 202 includes any number of entries 204. In some examples, an entry 204 includes any number of items of information. As an example, an entry 204 may be a row in a table. An entry 204 may include, but is not limited to, an address of a target resource (e.g., a Target Resource Address), an Access Domain Identifier, and a Valid Indicator. In some examples, a Target Resource Address is an address identifying a location within a target (e.g., targets 118, 120, 122 shown in FIG. 1 and described above) for which an access domain has access permissions. In some examples, an Access Domain Identifier is an identifier of an access domain and/or engine that has access permissions to a location indicated by the Target Resource Address with which it is associated (e.g., in the same row, as shown in the example of FIG. 2). In some examples, a Valid Indicator is an indication of whether a particular entry 204 is valid at a given point in time. Each of the Target Resource Address, Access Domain Identifier, and Valid Indicator portions of a particular entry 204 may be any form of data (e.g., one or more bits).

In some examples, the hardware identity impersonator 200, and thus the access domain identity data structure 202 therein, is associated with a set of one or more access domains and/or engines. In some examples, each of the entries 204 are associated with access domains and/or engines. A portion of the entries may be associated with the access domains and/or engines with which the hardware identity impersonator 200 is associated with and for which it is configured. As an example, the hardware identity impersonator 200 may be associated with an access domain having an access domain identifier "A", and the first two rows of the entries 204 indicate that the access domain A has access to target X and target Y respectively. One of ordinary skill in the art will appreciate that the first two entries, each having an access domain identifier A, may not, in some examples, be included in the access domain identity data structure 202, as entries for the access domain with which a hardware identity impersonator is associated may not be necessary. Other portions of the access domain identity data structure 202 (e.g., other entries of the entries 204) may be associated with other access domains and/or engines of a computing device (e.g., the computing device 100 shown in FIG. 1 and described above).

As an example, the hardware identity impersonator 200 may be configured for and associated with an access domain A (e.g., the access domain A 102 of FIG. 1). In this scenario, the first two rows of the entries 204 shown in FIG. 2 (which are optional, as described above) are associated with that access domain. Thus, the first two rows may be used for the access domain A to access target resources for which it has access permissions, without impersonating the identity of another access domain. Such entries for the access domain associated with the hardware identity impersonator, that are not related to identity impersonation, are optional. The third of the entries 204, shown as being mostly blank in FIG. 2, may be associated with an access domain B (e.g., the access domain B 104 of FIG. 1), and is mostly blank because the access domain B is not currently sharing access to any targets with the access domain A. In one or more embodiments, the third entry includes an access domain identifier B, which indicates that only access domain B may update the entry, and is also the identifier that would be used to allow the access domain A to impersonate the access domain B if access to a target resource of access domain B were being granted to access domain A. The fourth of the entries 204 is associated with an access domain C (e.g., the access domain C 106 of FIG. 1). As shown in FIG. 2, the access domain C has wants access domain A to have access to a region Z1 of a target Z to which access domain C has access permissions. Therefore, access domain C has requested that the hardware identity impersonator 200 be updated to have the fourth entry (which is associated with access domain C, per the access domain identifier C) to be updated to include the address of the region Z1, the access domain identifier C, and a valid indicator of Yes. While this entry remains valid, in this example, when access domain A transmits an operation request including the address of the region Z1 to the hardware identity impersonator 200, the hardware identity impersonator 200 performs a lookup, finds the address of the region Z1, obtains the access domain identifier C, and substitutes the access domain identifier C for that of A when transmitting the operation request for further access control checks by one or more access permission checking blocks (e.g., a memory management unit, a protection unit, etc.). In some examples, if an operation request includes a target address that is not included in the access domain identity data structure of a hardware identity impersonator, the operation request may be passed to the one or more access control checking blocks with the access domain identifier of the access domain requesting the operation.

In some examples, when the hardware identity impersonator 200 receives an operation request from an associated access domain, the hardware identity impersonator 200 may perform a lookup in the access domain identity data structure 202 using an address included in the operation request. In some examples, when the access domain identity data structure 202 does not include the address, the operation request is denied. In some examples, when the address exists in the access domain identity data structure 202, the operation request may proceed. In some examples, when the address is associated with an access domain identifier of an access domain with which the hardware identity impersonator 200 is associated, the hardware identity impersonator 200 may pass the operation request unchanged to one or more access permission checking blocks (e.g., a memory management unit) for further access control checks. In some examples, when the address is associated with an access domain identifier of an access domain other than an access domain with which the hardware identity impersonator is associated and configured for, the hardware identity impersonator may modify the operation request before transmitting the operation request to one or more access permission checking blocks.

In some examples, the modification of the operation request includes substituting the identifier of the access domain requesting the operation, which was received in the operation request, with the access domain identifier included in an entry of the entries 204 that corresponds to the address in the operation request that was used to perform the lookup in the access domain identity data structure 202. Such a substitution may allow the access domain requesting the operation to effectively impersonate the identity of the access domain identified by the access domain identifier, thereby allowing access to target resources that would otherwise be prevented by access control techniques. Such access may be allowed, for example, because various access permission checking blocks (e.g., a memory management unit, a protection unit, etc.) receive the operation request that includes the impersonated identity, and allow the operation based on the impersonated identity. The identity impersonation by one access domain of another access domain may thus allow for sharing of target resources without the need to re-configure the various access permission checking blocks (e.g., a memory management unit, a protection unit, etc.).

In some examples, as discussed above, certain entries of the entries 204 may be associated with the access domain for which the hardware identity impersonator 200 is configured, while other entries of the entries 204 may be associated with other access domains of a computing device (e.g., the computing device 100 of FIG. 1). In some examples, only the access domain with which a particular entry of the entries 204 is associated may request an update to the particular entry. As an example, in the access domain identity data structure 202 shown in FIG. 2, which is configured for an access domain A, the third row may only be updated by an access domain B, and the fourth row may only be updated by an access domain C. In some examples, explicit associations between entries of the entries 204 and access domains having permission to request updates to such entries prevents access domains that do not have access permissions for a particular target resource from allowing the access domain associated with the hardware identity impersonator 200 to access those particular target resources.

In some examples, the valid indicator portion of the access domain identity data structure 202 includes, for each of the entries 204, an indication of whether the entry is valid at a given time. In some examples, the access domain associated with a particular entry may request the valid indicator to be set to Yes (or any other representation of valid) when access to a particular target region is intended to be allowed for the access domain associated with the hardware identity impersonator 200. As an example, the valid indicator may be set to Yes when the entry is updated, and set to No when the service that was requested has been completed. The valid indicator may be checked by the access domain associated with the hardware identity impersonator 200 prior to said access domain requesting an operation using a particular target region. The valid indicator may also be verified by the hardware identity impersonator 200 upon receipt of an operation request. In some examples, if the valid indicator is set to No, then the access domain associated with the hardware identity impersonator 200 is not allowed to use the access domain identifier to impersonate the identity of another access domain for the purpose of accessing the associated target resource address.

FIG. 2 shows an example in which a the hardware identity impersonator 200 is associated with an access domain A. Thus, each entry in the access domain identity data structure 202 is implicitly associated with the access domain A, which is the access domain to which access to targets may be granted by other access domains using entries of the access domain identity table 202. Each entry in the access domain identity data structure 202 may also be associated with another access domain that is granting access to a particular target and/or target region. Such an association may be represented by the access domain identifier portion of a particular entry, which serves to indicate the identity of an access domain having permission to update the entry, as well as the identity that will be substituted for the identity of access domain A in order to allow access domain identity impersonation.

However, hardware identity impersonator configurations other than that shown in FIG. 2 may be used without departing from the scope of examples described herein. As an example, a particular hardware identity impersonator may be dedicated to an access domain that is granting target access to other access domains. In such a scenario, each entry in an access domain identity data structure is implicitly associated with the granting access domain, and each entry may explicitly include a portion that includes an identifier of an access domain to which access is to be granted. When the granting access domain updates an entry to include a target, or region therein, the hardware identity impersonator, when the access domain to which access is being granted seeks to access the target, may substitute the identity of the granting access domain for the identifier included in the entry that identifies the access domain to which target access is being granted. As another example, a hardware identity impersonator may be configured for more than one access domain. In such a scenario, each entry may include a portion for explicitly including an identifier of the access domain granting access to a target, as well as a portion for explicitly including an identifier of the access domain to which access is being granted. Each entry in such an access domain identity table (e.g., for two or more access domains) may only be updatable by the granting access domain identified by the identifier of the granting access domain. When a request to access the target is received by the hardware identity impersonator from the access domain to which access is being granted, the hardware identity impersonator may replace the identifier of the access domain to which target access is being granted with the identifier of the granting access domain, with both identifiers existing in the entry used to grant the target access.

While FIG. 2 shows a certain number of components in a particular configuration, one of ordinary skill in the art will appreciate that the hardware identity impersonator 200 may include more components or fewer components, and/or components arranged in any number of alternate configurations without departing from the scope of examples described herein. As an example, although FIG. 2 is described above as being associated with a particular access domain, a hardware identity impersonator may be associated with any number of access domains and/or any number of engines within access domains, as discussed above, without departing from the scope of examples described herein. As another example, although a given hardware identity impersonator is described herein as enforcing which access domains may update certain entries, a computing device may include a separate enforcement component operatively connected to one or more hardware identity impersonators of a computing device and configured to ensure that each entry in an access domain identity data structure is appropriately associated with an access domain to which target access is being granted, as well as an access domain granting said access and having permission to update the entry. Accordingly, examples disclosed herein should not be limited to the configuration of components shown in FIG. 2.

Figure 3:
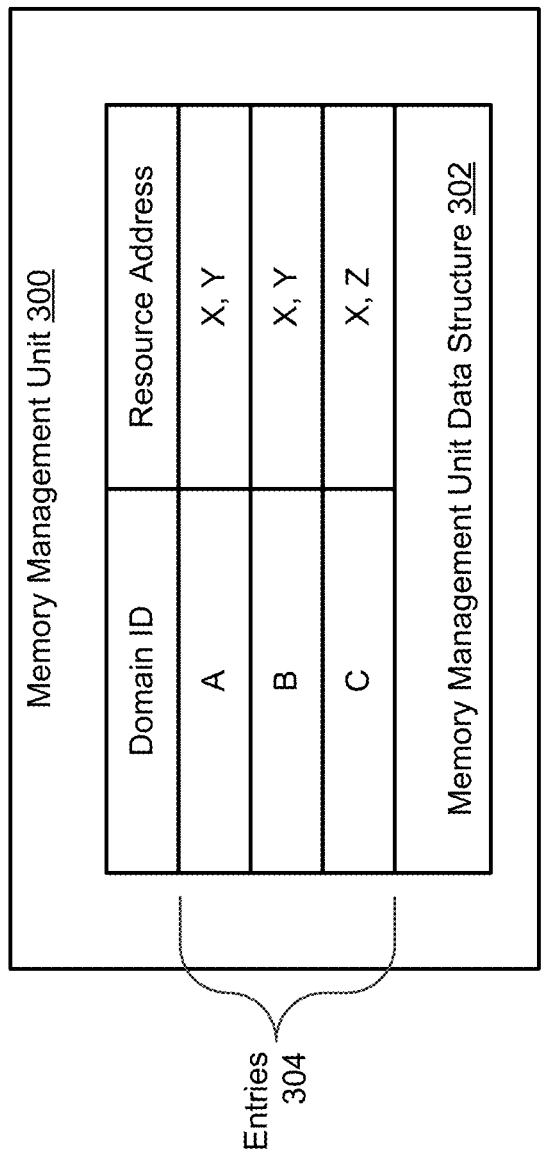
FIG. 3 is a block diagram illustrating a memory management unit, in accordance with some examples.

FIG. 3 is a block diagram of an example memory management unit 300 in accordance with one or more examples described herein. In some examples, the memory management unit 300 may be the memory management unit 114 shown in FIG. 1 and described above. As shown in FIG. 3, the memory management unit 300 includes memory management unit data structure 302, and entries 304 which are described below. Other components (e.g., circuitry implementing functionality of the memory management unit 300) of the memory management unit 300 are omitted for the sake of clarity.

In some examples, the memory management unit 300 includes the memory management unit data structure 302, which includes the entries 304. The memory management unit data structure 302 is intended as a simple example of a data structure in which access domains are associated with targets for which they have access permissions. In the example memory management unit data structure 302, the first entry of the entries 304 includes an association between a domain ID A of an access domain A (e.g., the access domain A 102 of FIG. 1) with target identifiers, referred to in FIG. 3 as resource addresses, of a target X (e.g., the target X 118 of FIG. 1) and a target Y (e.g., the target Y 120 od FIG. 1). The example memory management unit data structure 302 of FIG. 3 also includes a second entry of the entries 304 that includes an association between a domain ID B of an access domain B (e.g., the access domain B 104 of FIG. 1) with target identifiers, referred to in FIG. 3 as resource addresses, of the target X (e.g., the target X 118 of FIG. 1) and the target Y (e.g., the target Y 120 od FIG. 1) (e.g., indicating that the access domain A and the access domain B have access to the same target resources in this example). The example memory management unit data structure 302 of FIG. 3 also includes a third entry of the entries 304 that includes an association between a domain ID C of an access domain C (e.g., the access domain C 106 of FIG. 1) with target identifiers, referred to in FIG. 3 as resource addresses, of the target X (e.g., the target X 118 of FIG. 1) and the target Z (e.g., the target Z 122 od FIG. 1). Although the domain IDs and the resource addresses of FIG. 3 are shown as letters, one having ordinary skill in the art will appreciate that any form of data (e.g., bits) may be used to identify access domains and targets in the memory management unit data structure 302.

In some examples, the memory management unit 300 is configured to receive operation requests from one or more hardware identity impersonators (e.g., the hardware identity impersonator 200 of FIG. 2). In scenarios where access to a particular target resource is being shared, such an operation request may include an impersonated identity, which may be an identifier of an access domain having access permissions for a particular target resource instead of an identifier of the access domain that initiated the operation request. Thus, in some examples, the memory management unit 300 does not need re-configuration to be able to verify the operation request and allow the operation to proceed. In some examples, the memory management unit 300 is one of any number of access permission checking blocks, and contributes to implementing access control for target resources by performing an access permissions check, using the memory management unit data structure 302, when an operation request is received, in order to verify whether the domain ID included in the operation request is associated with the target resource that the operation to be performed will use.

While FIG. 3 shows a certain number of components in a particular configuration, one of ordinary skill in the art will appreciate that the memory management unit 300 may include more components or fewer components, and/or components arranged in any number of alternate configurations without departing from the scope of examples described herein. Accordingly, examples disclosed herein should not be limited to the configuration of components shown in FIG. 3.

Figure 4:
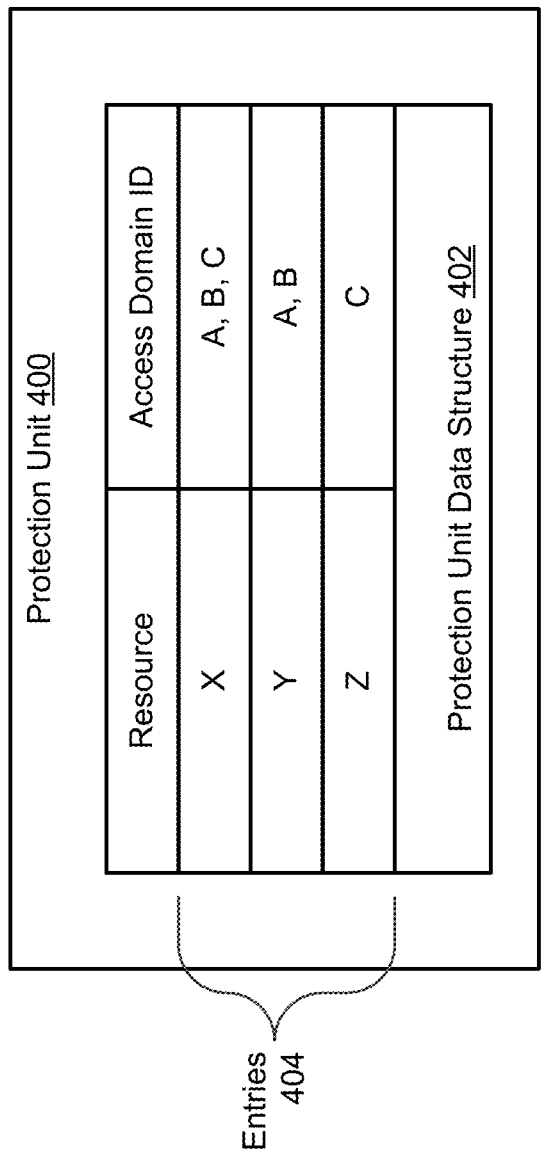
FIG. 4 is a block diagram illustrating a protection unit, in accordance with some examples.

FIG. 4 is a block diagram of an example protection unit 400 in accordance with one or more examples described herein. In some examples, the protection unit 400 may be the protection unit 116 shown in FIG. 1 and described above. As shown in FIG. 4, the protection unit 400 includes protection unit data structure 402, and entries 404 which are described below. Other components (e.g., circuitry implementing functionality of the protection unit 400) of the protection unit 400 are omitted for the sake of clarity.

In some examples, the protection unit 400 includes the protection unit data structure 402, which includes the entries 404. The protection unit data structure 402 is intended as a simple example of a data structure in which certain target resources are associated with one or more access domains having access permissions for the target resources. In the example protection unit data structure 402, the first entry of the entries 404 includes an association between a target resource X (e.g., the target X 118 of FIG. 1) and access domains associated with identifiers A, B, and C, indicating that each of those access domains has access permissions for the target resource X. In the example protection unit data structure 402, the second entry of the entries 404 includes an association between a target resource Y (e.g., the target Y 120 of FIG. 1) and access domains associated with identifiers A and B, indicating that each of those access domains has access permissions for the target resource Y. In the example protection unit data structure 402, the third entry of the entries 404 includes an association between a target resource Z (e.g., the target Z 122 of FIG. 1) and an access domain associated with an identifier C, indicating that the access domain C has access permissions for the target resource Z. Although the domain IDs and the resource addresses of FIG. 3 are shown as letters, one having ordinary skill in the art will appreciate that any form of data (e.g., bits) may be used to identify access domains and targets in the memory management unit data structure 302.

In some examples, the protection unit 400 is configured to receive operation requests from one or more memory management units (e.g., the memory management unit 300 of FIG. 3). In scenarios where access to a particular target resource is being shared, such an operation request may include an impersonated identity, which may be an identifier of an access domain having access permissions for a particular target resource instead of an identifier of the access domain that initiated the operation request. This, in some examples, the protection unit 400 does not need re-configuration to be able to verify the operation request and allow the operation to proceed. In some examples, the protection unit 400 is one of any number of access permission checking blocks, and contributes to implementing access control for target resources by performing an access permissions check, using the protection unit data structure 402, when an operation request is received, in order to verify whether the domain ID included in the operation request is associated with the target resource that the operation to be performed will use.

While FIG. 4 shows a certain number of components in a particular configuration, one of ordinary skill in the art will appreciate that the protection unit 400 may include more components or fewer components, and/or components arranged in any number of alternate configurations without departing from the scope of examples described herein. Accordingly, examples disclosed herein should not be limited to the configuration of components shown in FIG. 4.

Figure 5:
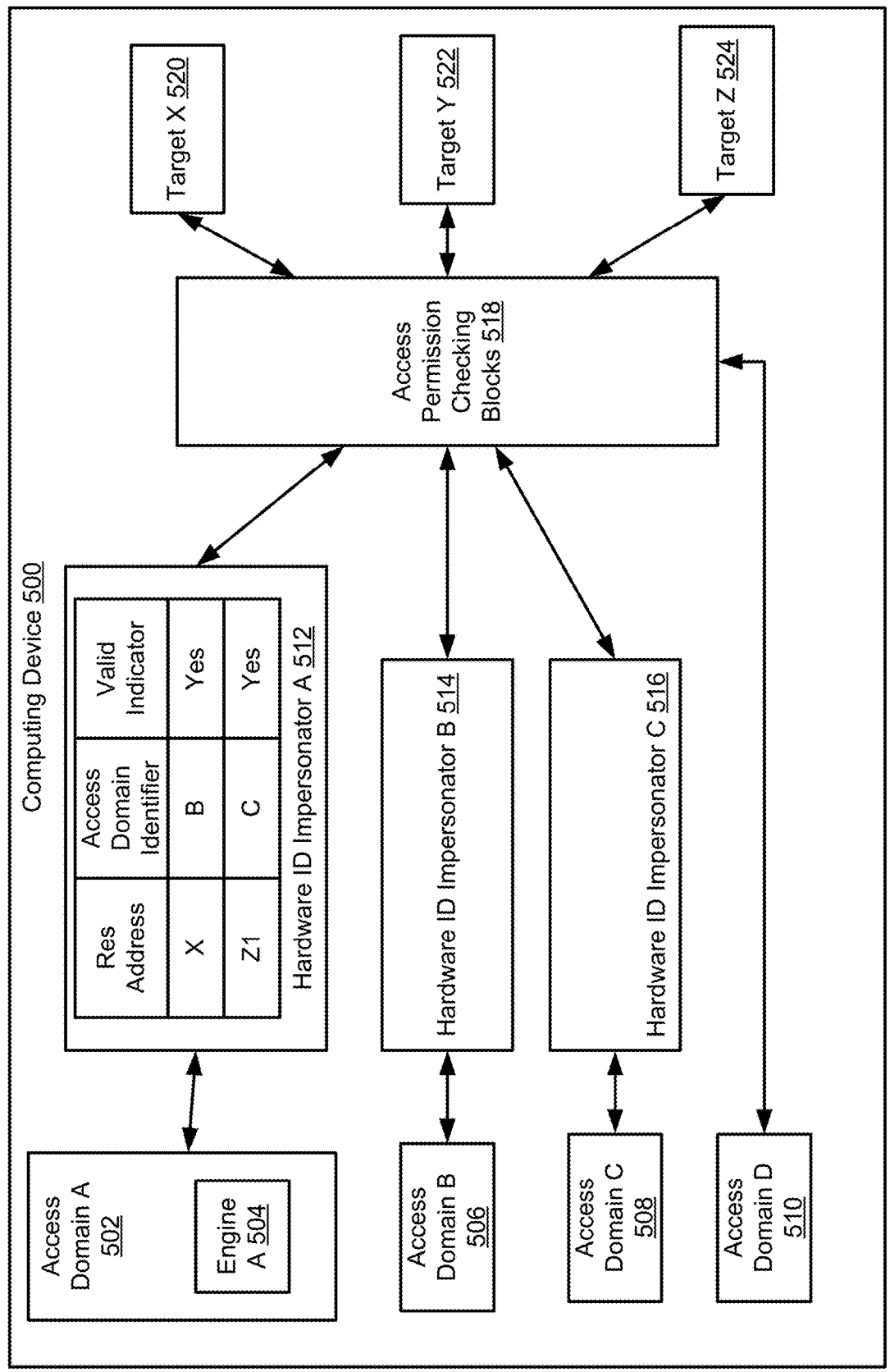
FIG. 5 is a block diagram illustrating a computing device, in accordance with some examples.

FIG. 5 illustrates an example computing device 500 in accordance with one or more examples described herein. The following example is for explanatory purposes only and not intended to limit the scope of examples described herein. Additionally, while the example shows certain aspects of examples described herein, all possible aspects of such examples may not be illustrated in this particular example.

According to aspects described herein, the computing device 500 may implement access control for target resources. The computing device 500 may be the same as or substantially similar to the computing device 100 shown in FIG. 1 and described above. The access domains 502, 506, and 508 may be the same as or substantially similar to the access domains 102, 104, and 106 shown in FIG. 1 and described above. In this example scenario, the access domain A 502 includes an engine 504, which is configured to request operations to be performed using target resources. The hardware ID impersonators 512, 514, and 516 may be the same as or substantially similar to the hardware identity impersonators 108, 110, and 112 shown in FIG. 1 and described above, and/or the hardware identity impersonator 200 shown in FIG. 2 and described above. In this example scenario, a portion of an access domain identity data structure (e.g., similar to the access domain identity data structure 202 shown in FIG. 2 and described above) is shown for the hardware ID impersonator 512. The access permission checking blocks 518 may be any hardware components of the computing device 500 used to implement access control techniques. As an example, the access permission checking blocks 518 may be or include a memory management unit (e.g., the memory management unit 114 of FIG. 1 or the memory management unit 300 of FIG. 3) and a protection unit (e.g., the protection unit 116 of FIG. 1 or the protection unit 400 of FIG. 4). The targets 520, 522, and 524 may be the same as or substantially similar to the targets 118, 120, and 122 shown in FIG. 1 and described above.

The example scenario shown in FIG. 5 is intended, in part, to illustrate a scenario in which the access domain B 506 has a need to share access to the target X 520 with the access domain A 502. To that end, the access domain B 506 has issued a request to the hardware ID impersonator A 512 associated with the access domain A to update an entry therein that is associated with the access domain B 506. Based on the request, the hardware ID impersonator A 512 has updated the first entry shown in the access domain identity data structure shown in FIG. 5 to include a resource address X, an access domain identifier B, and a valid indicator of yes. Thus, while the entry remains valid, operation requests made, for example, by the engine A 504 of the access domain A 502 to access the target X 520 may be allowed, and the hardware impersonator A 512 may substitute the access domain identifier B in place of the access domain identifier A when sending the operation request to the access permission checking blocks 518, thereby allowing the operation request to proceed as if it was initiated by the access domain B 506 rather than the access domain A 502. Accordingly, the access permission checking blocks 518 required no re-configuration for access to target X 520 to be shared from the access domain B 506 to the access domain A 502 and the engine A 504.

The example scenario shown in FIG. 5 is also intended, in part, to illustrate a scenario in which the access domain C 506 has a need to share access to a region Z1 of the target Z 524 with the access domain A 502. To that end, the access domain C 506 has issued a request to the hardware ID impersonator A 512 associated with the access domain A to update an entry therein that is associated with the access domain C 508. Based on the request, the hardware ID impersonator A 512 has updated the second entry shown in the access domain identity data structure shown in FIG. 5 to include a resource address Z1, an access domain identifier C, and a valid indicator of yes. Thus, while the entry remains valid, operation requests made, for example, by the engine A 504 of the access domain A 502 to access the region Z1 of the target Z 524 may be allowed, and the hardware impersonator A 512 may substitute the access domain identifier C in place of the access domain identifier A when sending the operation request to the access permission checking blocks 518, thereby allowing the operation request to proceed as if it was initiated by the access domain C 508 rather than the access domain A 502. Accordingly, the access permission checking blocks 518 required no re-configuration for access to region Z1 of the target Z 524 to be shared from the access domain C 508 to the access domain A 502 and the engine A 504.

The example scenario shown in FIG. 5 is also intended, in part, to illustrate a scenario in which the computing device 500 includes an access domain D 510 that is considered an untrusted domain, and that does not have access to the target X 520, the target Y 522, or the target Z 524. As such, the access domain D 510 has no associated entries in the hardware ID impersonator A 512, the hardware ID impersonator B 514, or the hardware ID impersonator C 516. Therefore, the access domain D 510 may not update entries in any of the hardware ID impersonators, and thus may not allow access to any of the targets to the other access domains. Moreover, the access permission checking blocks 518 will deny operation requests from the access domain D 510 that attempt to access the target X 520, the target Y 522, and/or the target Z 524.

Figure 6:
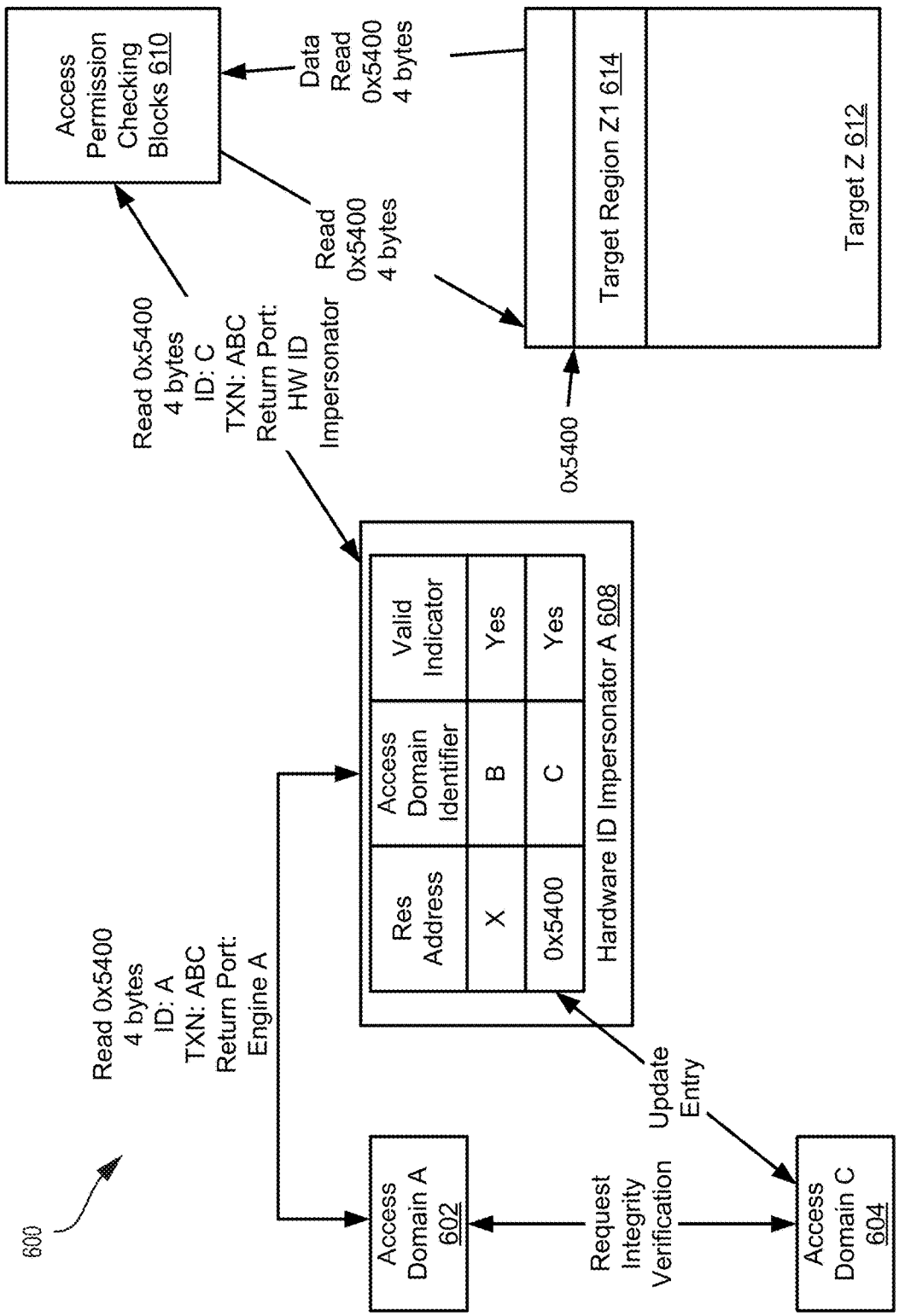
FIG. 6 is a block diagram illustrating an environment that includes a hardware identity impersonator, in accordance with some examples.

FIG. 6 illustrates an example environment 600 in accordance with one or more examples described herein. The following example is for explanatory purposes only and not intended to limit the scope of examples described herein. Additionally, while the example shows certain aspects of examples described herein, all possible aspects of such examples may not be illustrated in this particular example.

The environment 600 illustrated in FIG. 6 depicts an example scenario in which a computing device (not shown for the sake of clarity) is implementing access control for target resources. The computing device may be the same as or substantially similar to the computing device 100 shown in FIG. 1 and described above. The access domains 602 and 604 may be the same as or substantially similar to the access domains 102, 104, and 106 shown in FIG. 1 and described above. The hardware ID impersonator 608 may be the same as or substantially similar to the hardware identity impersonators 108, 110, and 112 shown in FIG. 1 and described above, and/or the hardware identity impersonator 200 shown in FIG. 2 and described above. In this example scenario, a portion of an access domain data identity structure (e.g., similar to the access domain identity data structure 202 shown in FIG. 2 and described above) is shown for the hardware ID impersonator 608. The access permission checking blocks 610 may be any hardware components of the computing device used to implement access control techniques. As an example, the access permission checking blocks 610 may be or include a memory management unit (e.g., the memory management unit 114 of FIG. 1 or the memory management unit 300 of FIG. 3) and a protection unit (e.g., the protection unit 116 of FIG. 1 or the protection unit 400 of FIG. 4). The target Z 612 may be the same as or substantially similar to the targets 118, 120, and 122 shown in FIG. 1 and described above. The target Z 612 in this example scenario includes a target region Z1 614.

In the example scenario of FIG. 6, the access domain C 604 desires to verify the integrity of data stored in the target region Z1 614. However, the capability to perform integrity verification is included in an engine (not shown) of the access domain A 602. Therefore, the access domain C 604 first requests an update of an entry in the access domain identity table of the hardware ID impersonator A 608, which is configured for the access domain A 602. The second entry in the access domain identity table may only be updated by the access domain C 604. In response to the request, the hardware ID impersonator A 608 updates the second entry to include the resource address 0x5400, which is the address within the target Z 612 of the target region Z1 614, as well as the access domain identifier C and a valid indicator of yes. Additionally or alternatively, after the access domain C 604 updates the second entry, and requests that the access domain A 602 perform the integrity verification, the access domain A 602 may check the relevant entry in the hardware ID impersonator A 608 to confirm that the second entry is correctly configured with the address and the identifier of access domain C and, if so, set the valid indicator to yes.

The access domain C 604 may then send the request for integrity verification to the access domain A 602, which includes an indication that the access domain C 604 has made the necessary update to the access domain identity table of the hardware ID impersonator A 608 to allow the access domain A 602 to access the target region Z1 614. The request also provides the address for the target region Z1 614 of 0x5400. Next, the access domain A 602 verifies that the entry in the access domain identity table of the hardware ID impersonator A that is associated with the access domain C includes a valid indicator of yes. After successful verification of the valid indicator, the access domain A 602 issues an operation request to the hardware ID impersonator A 608. The operation request includes the following bus attributes: an operation of Read; an address of 0x5400; an access domain ID of A; a transaction number (TXN) of ABC; and a return port associated with an engine A, which is the engine that will perform the integrity verification.

Next, the hardware ID impersonator 608 performs a lookup of the address 0x5400 received in the operation request and finds the address in a valid entry of the access domain identity table. Based on the successful lookup, the hardware ID impersonator 608 modifies the operation request to include an access domain ID of C instead of an access domain ID of A, and a return port associated with the hardware ID impersonator 608 to allow the result of the read operation to be routed back to the hardware ID impersonator 608. The hardware ID impersonator A 608 then transmits the operation request to the access permission checking blocks 610. A memory management unit of the access permission checking blocks 610 performs a first access control check for the operation request, which passes because the access domain identifier therein is C, and the access domain C has access permissions for the target Z 612, which includes the target region Z1 614 at the address 0x5400. A protection unit of the access permission checking blocks 610 performs a second access control check for the operation request, which passes because the access domain identifier therein is C, and the access domain C has access permissions for the target Z 612, which includes the target region Z1 614 at the address 0x5400.

After a successful first access control check and a second access control check by the access permission checking blocks 610, the read operation is sent to the target Z 612, and the data in the target region Z1 614 at the address 0x5400 is obtained and made available to the engine of access domain A 602 to perform the integrity verification requested by the accessed domain C. The engine executes a hash function with the data as input to obtain a hash of the data, compares the hash with a previously generated hash of the data, and reports a successful match to the access domain C 604, thereby completing the service requested by the access domain C. After completion of the service, the access domain C 604 sends a request to the hardware ID impersonator to delete the entry allowing access domain A to access the target region Z1 614. In this scenario, through the use of the hardware impersonator A 608, no re-configuration of any of the access permission checking blocks 610 was required, thereby reducing the complexity and improving the access time needed for the access domain C 604 to share access to the target region Z1 614 with the access domain A 602.

Figure 7:
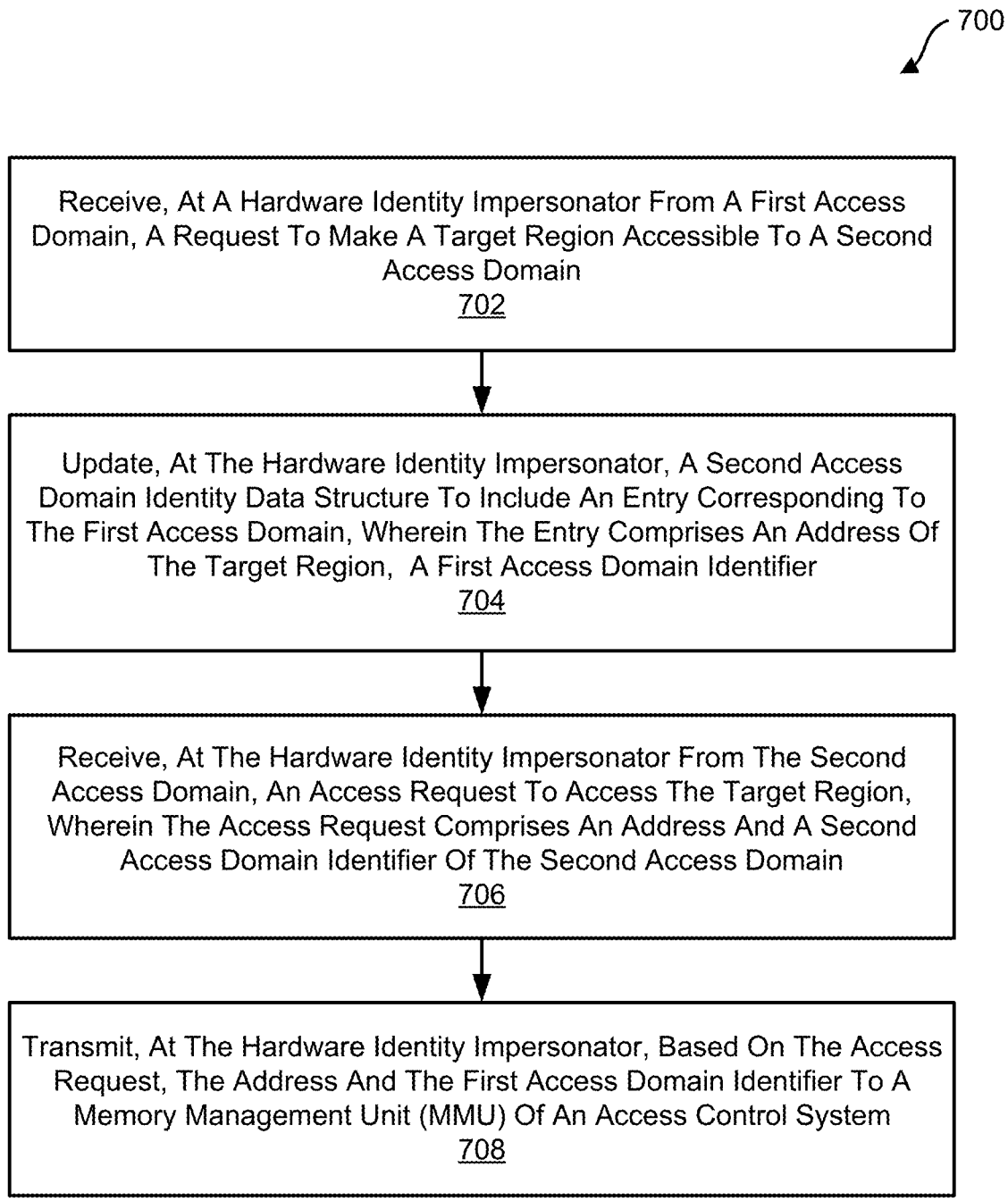
FIG. 7 is a flow diagram illustrating an example process for identity impersonation in access control systems, in accordance with some examples.

FIG. 7 is a flow diagram illustrating an example of a process 700 for identity impersonation in access control systems in accordance with examples described herein. The process 700 may be performed, at least in part, for example, by any one of the hardware identity impersonators 108, 110, and 112 shown in FIG. 1 and described above, and/or the hardware identity impersonator 200 shown in FIG. 2 and described above.

At block 702, the process 700 includes receiving, at a hardware identity impersonator (e.g., hardware identity impersonators 108, 110, 112 of FIG. 1) from a first access domain (e.g., access domains 102, 104, 106, of FIG. 1), a request to make a target region (e.g., of targets 118, 120, 122 of FIG. 1) accessible to a second access domain. In some examples, an access domain is a set of one or more engines for performing any number of operations using information stored in any number of targets and/or target regions. In some examples, a target, or any region therein, is any device, component, etc. that includes any amount of data that may be operated on by any number of access domains and/or engines therein. As an example, a particular access domain may seek to have another access domain perform an operation. In such an example, the particular access domain may request to update an entry in an access domain identity table to allow the other access domain to access a particular target by impersonating the identity of the particular access domain.

At block 704, the process 700 includes updating, at the hardware identity impersonator, a second access domain identity data structure to include an entry corresponding to the first access domain, wherein the entry comprises an address of the target region and a first access domain identifier. In some examples, the entry may be configured such that only the first access domain may cause the update of the entry. In some examples, once an entry is configured, the second access domain may verify the configuration of the entry and, if valid, set a valid indicator to indicate the validity of the entry (e.g., based on the presence of an entry having the address and also the correct access domain identifier(s)).

At block 706, the process 700 includes receiving, at the hardware identity impersonator from the second access domain, an access request to access the target region, wherein the access request comprises an address and a second access domain identifier of the second access domain. As an example, an access domain that has been requested to perform an operation by another access domain using information stored in a target associated with, controlled by, etc. the other domain may send a request to access the particular target for performing the operation. In some examples, the address is used to perform a lookup in an access domain identity table.

At block 708, the process 700 includes transmitting, at the hardware identity impersonator based on the access request, the address and the first access domain identifier to a memory management unit (MMU) of an access control system. In some examples, including the first access domain identifier allows the second access domain to impersonate the first access domain to various access permission checking blocks, such as the MMU, in order to access the address included in the request.

In some examples, the process 700, or any other process described herein may be performed by a computing device or apparatus, and/or one or more components therein and/or to which the computing device is operatively connected. As an example, the process 700 may be performed wholly or in part by any one of the hardware identity impersonators 108, 110, and 112 shown in FIG. 1 and described above, and/or the hardware identity impersonator 200 shown in FIG. 2 and described above A hardware identity impersonator may be, include, or be a component of any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, a smart speaker, a voice assistant device, a SoC, and/or any other device with the resource capabilities to perform the processes described herein, including the process 700, and/or other process described herein. In some cases, a computing device or apparatus (e.g., that includes a hardware identity impersonator) may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, an RF sensing component, any combination thereof, and/or other component(s). The network interface may be configured to communicate and/or receive Internet Protocol (IP) based data or other type of data.

The components of a hardware identity impersonator may be implemented, at least in part, in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented, at least in part, using computer software, firmware, or any combination thereof, to perform the various operations described herein.

The process 700 shown in FIG. 7 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
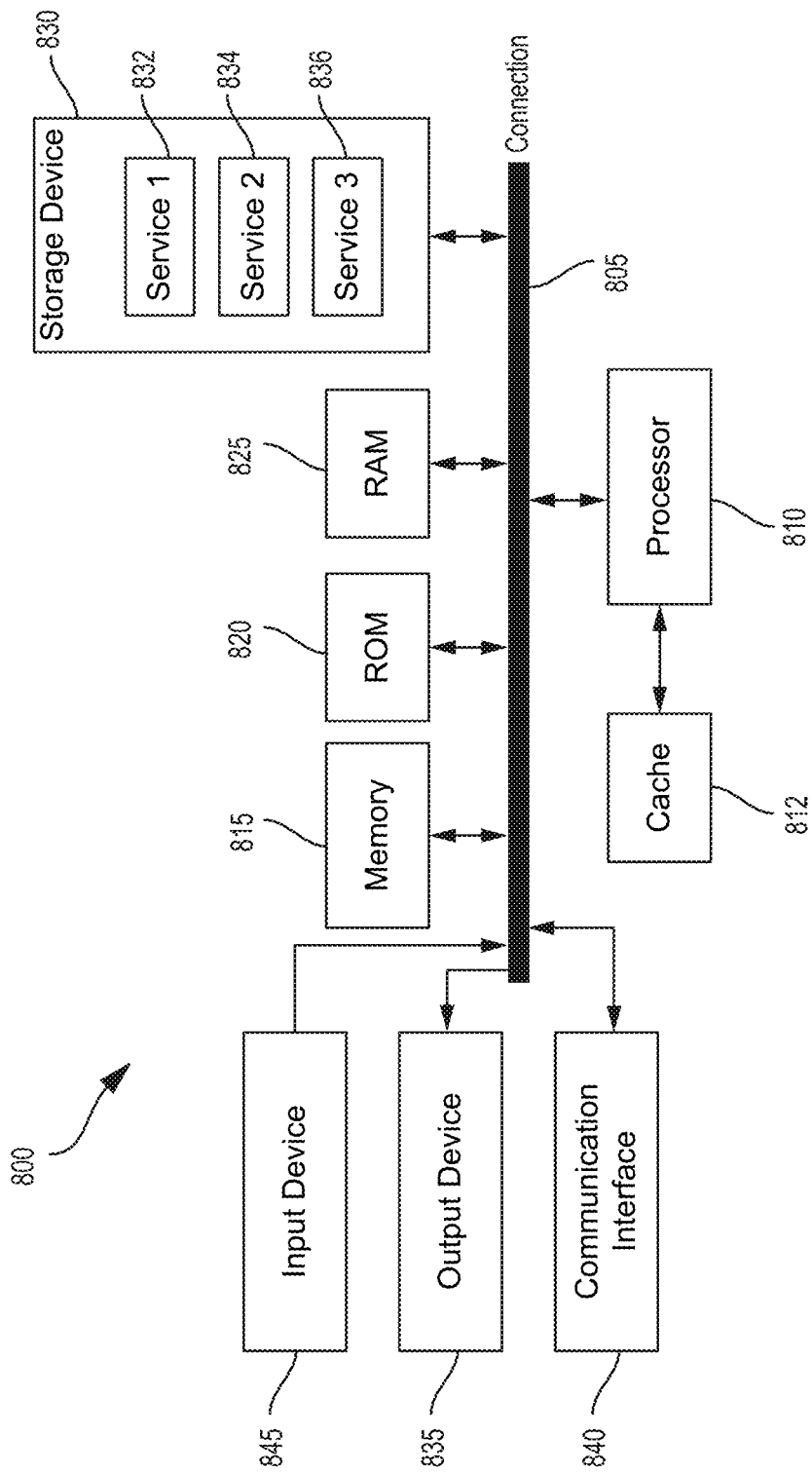
FIG. 8 is a diagram illustrating an example of a computing system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for identity impersonation in access control systems, the method comprising: receiving, at a hardware identity impersonator from a first access domain, a request to make a target region accessible to a second access domain; updating, at the hardware identity impersonator, a second access domain identity data structure to include an entry corresponding to the first access domain, wherein the entry comprises an address of the target region and a first access domain identifier; receiving, at the hardware identity impersonator from the second access domain, an access request to access the target region, wherein the access request comprises an address and a second access domain identifier of the second access domain; and transmitting, at the hardware identity impersonator based on the access request, the address and the first access domain identifier to a memory management unit (MMU) of an access control system.

Aspect 2: The method of aspect 1, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

Aspect 3: The method of aspects 1 or 2, further comprising, before transmitting the address and the first access domain identifier: performing, at the hardware identity impersonator, a lookup in the second access domain identity data structure using the address to obtain the first access domain identifier.

Aspect 4: The method of any of aspects 1-3, wherein: the access request is a read request; and obtaining access to the target region comprises allowing an engine of the second access domain to perform a read from the target region.

Aspect 5: The method of any of aspects 1-4, wherein: the access request is a write request; and obtaining access to the target region comprises allowing an engine of the second access domain to perform a write to the target region.

Aspect 6: The method of any of aspects 1-5, wherein the access request corresponds to an operation to be performed by a second access domain execution engine of the second access domain using data from the target region.

Aspect 7: The method of any of aspects 1-6, further comprising, after the operation is performed by the second access domain execution engine: receiving, at the hardware identity impersonator, a second request from the first access domain to delete the entry; and deleting, at the hardware identity impersonator, the entry from the second access domain identity data structure, wherein deleting the entry removes access to the target region from the second access domain.

Aspect 8: The method of any of aspects 1-7, wherein the operation to be performed by the second access domain execution engine is requested by a first access domain execution engine of the first access domain.

Aspect 9: The method of any of aspects 1-8, further comprising: receiving, at the hardware identity impersonator, a second request from a third access domain to make a second target region accessible to the second access domain; determining, at the hardware identity impersonator, that the third access domain does not have access the second target region; and denying the second request based on determining that the third access domain does not have access to the second target region.

Aspect 10: The method of any of aspects 1-9, further comprising: receiving, at the hardware identity impersonator, a second request from a third access domain to make a second target region accessible to the second access domain; determining, at the hardware identity impersonator, that the third access domain is an untrusted access domain; and denying the second request based on determining that the third access domain is the untrusted access domain.

Aspect 11: The method of any of aspects 1-10, wherein the entry further comprises a valid indicator, and the access request is transmitted based at least in part on the valid indicator.

Aspect 12: The method of any of aspects 1-11, wherein the access request comprises the address, a size, and an operation type, and the method further comprises: transmitting, at the hardware identity impersonator, the size and the operation type to the MMU.

Aspect 13: An apparatus for identity impersonation in access control systems, the apparatus comprising: at least one memory; and at least one processor coupled to the at least one memory and configured to: receive, via a hardware identity impersonator and from a first access domain, a request to make a target region accessible to a second access domain; update, at the hardware identity impersonator, a second access domain identity data structure to include an entry corresponding to the first access domain, wherein the entry comprises an address of the target region and a first access domain identifier; receive, at the hardware identity impersonator from the second access domain, an access request to access the target region, wherein the access request comprises an address and a second access domain identifier of the second access domain; and transmit, from the hardware identity impersonator based on the access request, the address and the first access domain identifier to a memory management unit (MMU) of an access control system.

Aspect 14: The apparatus of aspect 13, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

Aspect 15: The apparatus of aspect 13 or 14, wherein the at least one process is further configured to, before transmitting the address and the first access domain identifier: perform, at the hardware identity impersonator, a lookup in the second access domain identity data structure using the address to obtain the first access domain identifier.

Aspect 16: The apparatus of any of aspects 13-15, wherein: the access request is a read request; and to obtain access to the target region, the at least one processor is further configured to allow an engine of the second access domain to perform a read from the target region.

Aspect 17: The apparatus of any of aspects 13-16, wherein: the access request is a write request; and to obtain access to the target region, the at least one processor is further configured to allow an engine of the second access domain to perform a write to the target region.

Aspect 18: The apparatus of any of aspects 13-17, wherein the access request corresponds to an operation to be performed by a second access domain execution engine of the second access domain using data from the target region.

Aspect 19: The apparatus of any of aspects 13-18, wherein the at least one processor is further configured to, after the operation is performed by the second access domain execution engine: receive, via the hardware identity impersonator, a second request from the first access domain to delete the entry; and delete, at the hardware identity impersonator, the entry from the second access domain identity data structure, wherein deleting the entry removes access to the target region from the second access domain.

Aspect 20: The apparatus of any of aspects 13-19, wherein the operation to be performed by the second access domain execution engine is requested by a first access domain execution engine of the first access domain.

Aspect 21: The apparatus of any of aspects 13-20, wherein the at least one processor is further configured to: receive, via the hardware identity impersonator, a second request from a third access domain to make a second target region accessible to the second access domain; determine, via the hardware identity impersonator, that the third access domain does not have access to the second target region; and deny the second request based on determining that the third access domain does not have access the second target region.

Aspect 22: The apparatus of any of aspects 13-21, wherein the at least one processor is further configured to: receive, via the hardware identity impersonator, a second request from a third access domain to make a second target region accessible to the second access domain; determine, via the hardware identity impersonator, that the third access domain is an untrusted access domain; and deny the second request based on determining that the third access domain is the untrusted access domain.

Aspect 23: The apparatus of any of aspects 13-22, wherein the entry further comprises a valid indicator, and the access request is transmitted based at least in part on the valid indicator.

Aspect 24: The apparatus of any of aspects 13-23, wherein the access request comprises the address, a size, and an operation type, and the at least one processor is further configured to: transmit, via the hardware identity impersonator, the size and the operation type to the MMU.

Aspect 25: A non-transitory computer-readable medium having stored thereon instructions that, when executed by one or more processors, cause the one or more processors to: receive, via a hardware identity impersonator from a first access domain, a request to make a target region accessible to a second access domain; update, at the hardware identity impersonator, a second access domain identity data structure to include an entry corresponding to the first access domain, wherein the entry comprises an address of the target region and a first access domain identifier; receive, at the hardware identity impersonator from the second access domain, an access request to access the target region, wherein the access request comprises an address and a second access domain identifier of the second access domain; and transmit, via the hardware identity impersonator and based on the access request, the address and the first access domain identifier to a memory management unit (MMU) of an access control system.

Aspect 26: The non-transitory computer readable medium of aspect 25, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

Aspect 27: The non-transitory computer readable medium of aspect 25 or 26, having stored thereon further instructions that, when executed by the one or more processors, cause the one or more processors to, before transmitting the address and the first access domain identifier: perform, at the hardware identity impersonator, a lookup in the second access domain identity data structure using the address to obtain the first access domain identifier.

Aspect 28: The non-transitory computer readable medium of aspects 25-27, wherein the access request corresponds to an operation to be performed by a second access domain execution engine of the second access domain using data from the target region.

Aspect 29: The non-transitory computer readable medium of aspects 25-28, wherein the operation to be performed by the second access domain execution engine is requested by a first access domain execution engine of the first access domain.

Aspect 30: The non-transitory computer readable medium of aspects 25-29, wherein the access request comprises the address, a size, and an operation type, and wherein the non-transitory computer readable medium comprises further instructions that, when executed by the one or more processors, cause the one or more processors to: transmit, via the hardware identity impersonator, the size and the operation type to the MMU.

Aspect 31: An apparatus for identity impersonation in access control systems, including one or more means for performing operations according to any of aspects 1-12.

What is claimed is:
1. A method for identity impersonation in access control systems, the method comprising:
   receiving, at a hardware identity impersonator from a first access domain, a request to make a target region accessible to a second access domain;
   updating, at the hardware identity impersonator, a second access domain identity data structure to include an entry corresponding to the first access domain, wherein the entry comprises an address of the target region and a first access domain identifier;
   receiving, at the hardware identity impersonator from the second access domain, an access request to access the target region, wherein the access request comprises the address of the target region and a second access domain identifier of the second access domain;
   replacing, by the hardware identity impersonator, the second access domain identifier with the first access domain identifier;
   transmitting, by the hardware identity impersonator based on the access request, the address and the first access domain identifier to a memory management unit (MMU) of an access control system; and obtaining, at the second access domain, based on the access request by the hardware identity impersonator, data from the target region, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

2. The method of claim 1, wherein the access request corresponds to an operation to be performed by a second access domain execution engine of the second access domain using data from the target region.

3. The method of claim 2, further comprising, after the operation is performed by the second access domain execution engine:

receiving, at the hardware identity impersonator, a second request from the first access domain to delete the entry; and deleting, at the hardware identity impersonator, the entry from the second access domain identity data structure, wherein deleting the entry removes access to the target region from the second access domain.

4. The method of claim 2, wherein the operation to be performed by the second access domain execution engine is requested by a first access domain execution engine of the first access domain.

5. The method of claim 1, further comprising, before transmitting the address and the first access domain identifier:

performing, at the hardware identity impersonator, a lookup in the second access domain identity data structure using the address to obtain the first access domain identifier.

6. The method of claim 1, wherein:

the access request is a read request; and obtaining access to the target region comprises allowing an engine of the second access domain to perform a read from the target region.

7. The method of claim 1, wherein:

the access request is a write request; and obtaining access to the target region comprises allowing an engine of the second access domain to perform a write to the target region.

8. The method of claim 1, further comprising:

receiving, at the hardware identity impersonator, a second request from a third access domain to make a second target region accessible to the second access domain;

determining, at the hardware identity impersonator, that the third access domain does not have access to the second target region; and denying the second request based on determining that the third access domain does not have access to the second target region.

9. The method of claim 1, further comprising:

receiving, at the hardware identity impersonator, a second request from a third access domain to make a second target region accessible to the second access domain;

determining, at the hardware identity impersonator, that the third access domain is an untrusted access domain; and denying the second request based on determining that the third access domain is the untrusted access domain.

10. The method of claim 1, wherein the entry further comprises a valid indicator, and the access request is transmitted based at least in part on the valid indicator.

11. The method of claim 1, wherein the access request comprises the address, a size, and an operation type, and the method further comprises:

transmitting, at the hardware identity impersonator, the size and the operation type to the MMU.

12. An apparatus for identity impersonation in access control systems, the apparatus comprising:

at least one memory; and at least one processor coupled to the at least one memory and configured to:

receive, via a hardware identity impersonator and from a first access domain, a request to make a target region accessible to a second access domain;

update, at the hardware identity impersonator, a second access domain identity data structure to include an entry corresponding to the first access domain, wherein the entry comprises an address of the target region and a first access domain identifier;

receive, at the hardware identity impersonator from the second access domain, an access request to access the target region, wherein the access request comprises the address of the target region and a second access domain identifier of the second access domain;

replace, by the hardware identity impersonator, the second access domain identifier with the first access domain identifier;

transmit, from the hardware identity impersonator based on the access request, the address and the first access domain identifier to a memory management unit (MMU) of an access control system; and obtain, at the second access domain, based on the access request by the hardware identity impersonator, data from the target region, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

13. The apparatus of claim 12, wherein the access request corresponds to an operation to be performed by a second access domain execution engine of the second access domain using data from the target region.

14. The apparatus of claim 13, wherein the at least one processor is further configured to, after the operation is performed by the second access domain execution engine:

receive, via the hardware identity impersonator, a second request from the first access domain to delete the entry; and delete, at the hardware identity impersonator, the entry from the second access domain identity data structure, wherein deleting the entry removes access to the target region from the second access domain.

15. The apparatus of claim 13, wherein the operation to be performed by the second access domain execution engine is requested by a first access domain execution engine of the first access domain.

16. The apparatus of claim 12, wherein the at least one processor is further configured to, before transmitting the address and the first access domain identifier:

perform, at the hardware identity impersonator, a lookup in the second access domain identity data structure using the address to obtain the first access domain identifier.

17. The apparatus of claim 12, wherein: the access request is a read request; and to obtain access to the target region, the at least one processor is further configured to allow an engine of the second access domain to perform a read from the target region.

18. The apparatus of claim 12, wherein:
the access request is a write request; and
to obtain access to the target region, the at least one processor is further configured to allow an engine of the second access domain to perform a write to the target region.

19. The apparatus of claim 12, wherein the at least one processor is further configured to:
receive, via the hardware identity impersonator, a second request from a third access domain to make a second target region accessible to the second access domain;
determine, via the hardware identity impersonator, that the third access domain does not have access to the second target region; and
deny the second request based on determining that the third access domain does not have access the second target region.

20. The apparatus of claim 12, wherein the at least one processor is further configured to:
receive, via the hardware identity impersonator, a second request from a third access domain to make a second target region accessible to the second access domain;
determine, via the hardware identity impersonator, that the third access domain is an untrusted access domain; and
deny the second request based on determining that the third access domain is the untrusted access domain.

21. The apparatus of claim 12, wherein the entry further comprises a valid indicator, and the access request is transmitted based at least in part on the valid indicator.

22. The apparatus of claim 12, wherein the access request comprises the address, a size, and an operation type, and the at least one processor is further configured to:
transmit, via the hardware identity impersonator, the size and the operation type to the MMU.

23. A non-transitory computer-readable medium having stored thereon instructions that, when executed by one or more processors, cause the one or more processors to:
receive, via a hardware identity impersonator from a first access domain, a request to make a target region accessible to a second access domain;
update, at the hardware identity impersonator, a second access domain identity data structure to include an entry corresponding to the first access domain, wherein the entry comprises an address of the target region and a first access domain identifier;
receive, at the hardware identity impersonator from the second access domain, an access request to access the target region, wherein the access request comprises the address of the target region and a second access domain identifier of the second access domain;
replace, by the hardware identity impersonator, the second access domain identifier with the first access domain identifier;
transmit, via the hardware identity impersonator and based on the access request, the address and the first access domain identifier to a memory management unit (MMU) of an access control system; and
obtain, at the second access domain, based on the access request by the hardware identity impersonator, data from the target region, wherein the second access domain obtains access to the target region based on a successful first access control check by the MMU and a successful second access control check by a protection unit of the access control system, and wherein the successful first access control check and the successful second access control check are based at least in part on the address of the target region and the first access domain identifier.

24. The non-transitory computer-readable medium of claim 23, wherein the access request corresponds to an operation to be performed by a second access domain execution engine of the second access domain using data from the target region.

25. The non-transitory computer-readable medium of claim 24, wherein the operation to be performed by the second access domain execution engine is requested by a first access domain execution engine of the first access domain.

26. The non-transitory computer-readable medium of claim 23 having stored thereon further instructions that, when executed by the one or more processors, cause the one or more processors to, before transmitting the address and the first access domain identifier:
perform, at the hardware identity impersonator, a lookup in the second access domain identity data structure using the address to obtain the first access domain identifier.

27. The non-transitory computer-readable medium of claim 23, wherein the access request comprises the address, a size, and an operation type, and wherein the non-transitory computer-readable medium comprises further instructions that, when executed by the one or more processors, cause the one or more processors to:
transmit, via the hardware identity impersonator, the size and the operation type to the MMU.

* * * * *